(12) United States Patent
Ogura et al.

(10) Patent No.: US 12,470,679 B2
(45) Date of Patent: Nov. 11, 2025

(54) INFORMATION PROCESSING DEVICE, INFORMATION PROCESSING METHOD, PROGRAM, AND DISPLAY SYSTEM

(71) Applicant: Sony Group Corporation, Tokyo (JP)

(72) Inventors: Sho Ogura, Kanagawa (JP); Yoshihiro Yoshioka, Kanagawa (JP); Keiichi Yoshioka, Tokyo (JP); Jun Yoshikawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 5 days.

(21) Appl. No.: 18/272,489

(22) PCT Filed: Jan. 27, 2022

(86) PCT No.: PCT/JP2022/003043
§ 371 (c)(1),
(2) Date: Jul. 14, 2023

(87) PCT Pub. No.: WO2022/181175
PCT Pub. Date: Sep. 1, 2022

(65) Prior Publication Data
US 2024/0314279 A1 Sep. 19, 2024

(30) Foreign Application Priority Data
Feb. 25, 2021 (JP) .................. 2021-028706

(51) Int. Cl.
*H04N 13/117* (2018.01)
*H04N 13/282* (2018.01)
(Continued)

(52) U.S. Cl.
CPC ......... *H04N 13/117* (2018.05); *H04N 13/282* (2018.05); *H04N 13/349* (2018.05); *H04N 13/398* (2018.05)

(58) Field of Classification Search
CPC .. H04N 13/117; H04N 13/282; H04N 13/349; H04N 13/398; H04N 21/21805;
(Continued)

(56) References Cited

U.S. PATENT DOCUMENTS

2008/0088706 A1* 4/2008 Girgensohn ........... H04N 7/181
348/207.99
2013/0107020 A1* 5/2013 Hashimoto .......... H04N 13/221
348/50

(Continued)

FOREIGN PATENT DOCUMENTS

JP 2015-114716 A 6/2015
JP 2019-045995 A 3/2019
(Continued)

*Primary Examiner* — William C Vaughn, Jr.
*Assistant Examiner* — Astewaye Gettu Zewede
(74) *Attorney, Agent, or Firm* — Paratus Law Group, PLLC

(57) ABSTRACT

An information processing device according to the present technology includes a display control unit that controls a display of rotation center position information on a target space captured image that is an image in which a real space for which a free-viewpoint image is to be generated is captured, the rotation center position information indicating a position of viewpoint rotation center of the free-viewpoint image.

17 Claims, 38 Drawing Sheets

(51) Int. Cl.
*H04N 13/349* (2018.01)
*H04N 13/398* (2018.01)

(58) Field of Classification Search
CPC .. H04N 21/6587; H04N 21/816; H04N 23/90; H04N 5/222; H04N 7/181
USPC .......................................................... 348/48
See application file for complete search history.

(56) References Cited

U.S. PATENT DOCUMENTS

| | | | |
|---|---|---|---|
| 2019/0158801 A1* | 5/2019 | Matsubayashi | G06T 1/00 |
| 2019/0172271 A1* | 6/2019 | Yasuda | G06F 3/011 |
| 2020/0226736 A1* | 7/2020 | Kar | H04N 13/271 |

FOREIGN PATENT DOCUMENTS

| | | | |
|---|---|---|---|
| JP | 2019-056978 A | 4/2019 | |
| JP | 2020-021104 A | 2/2020 | |
| JP | 2020-173529 A | 10/2020 | |
| WO | WO 2018/030206 A1 | 2/2018 | |

* cited by examiner

Fig. 15
A 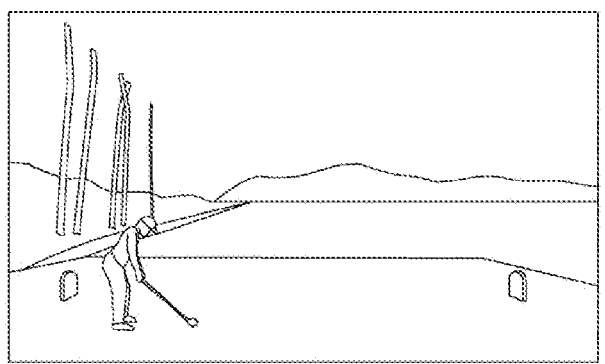
B 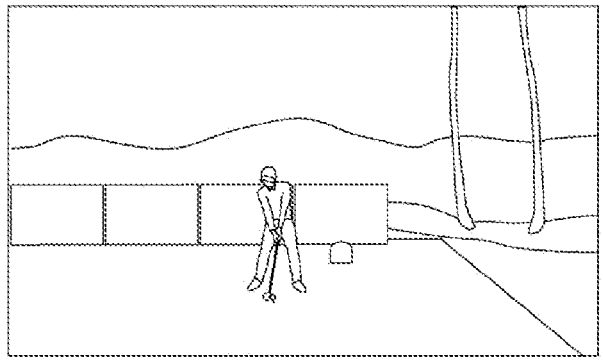

Fig. 16
A 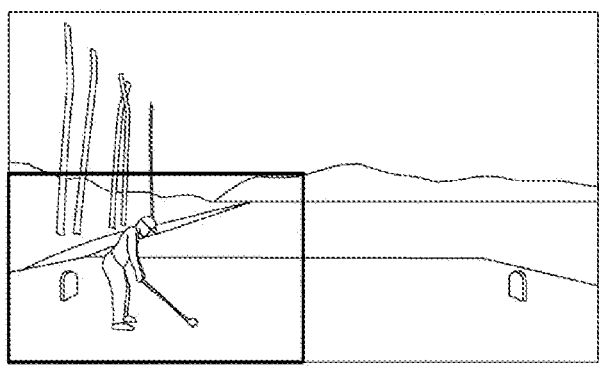
B 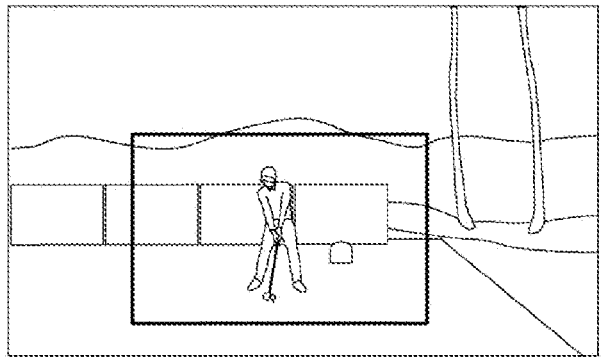

Fig. 22
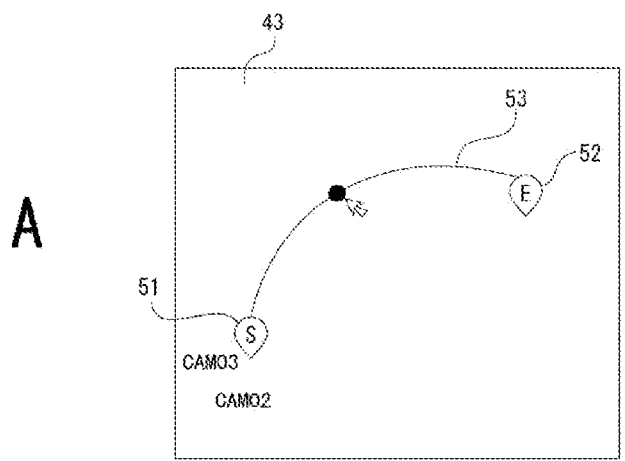
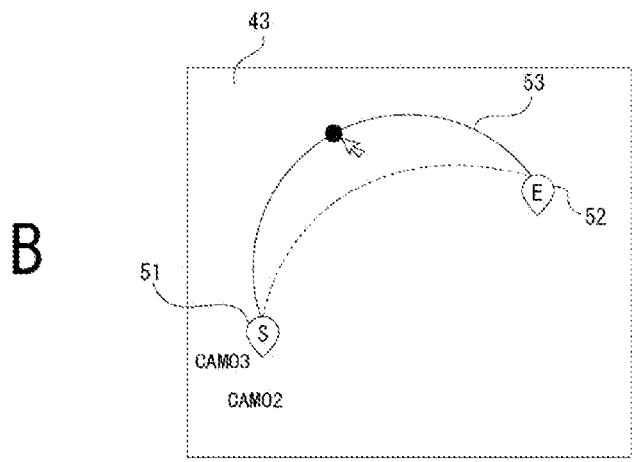

Fig. 23
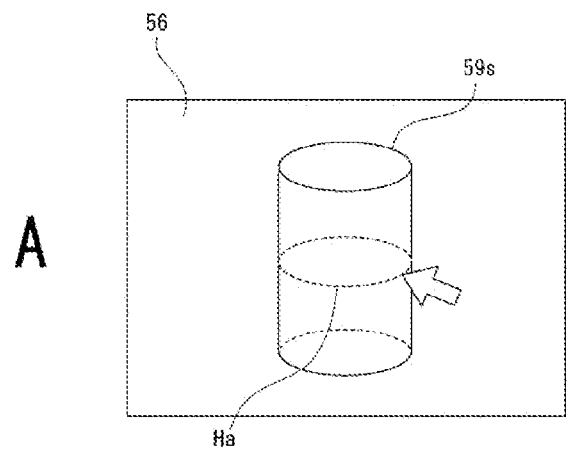
A
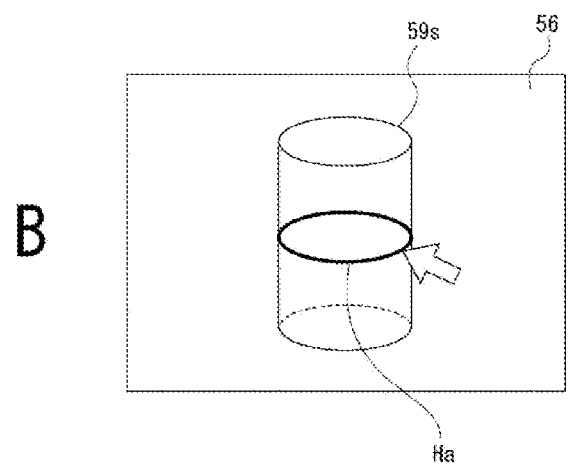
B

Fig. 25
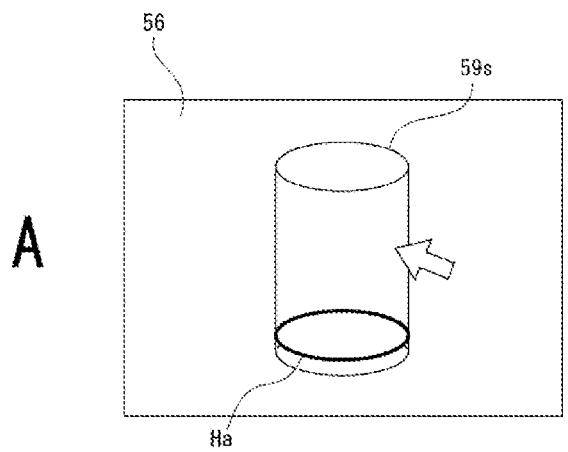
A
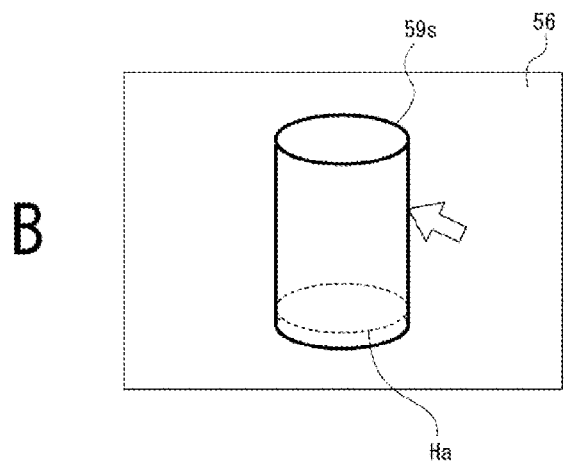
B

Fig. 26
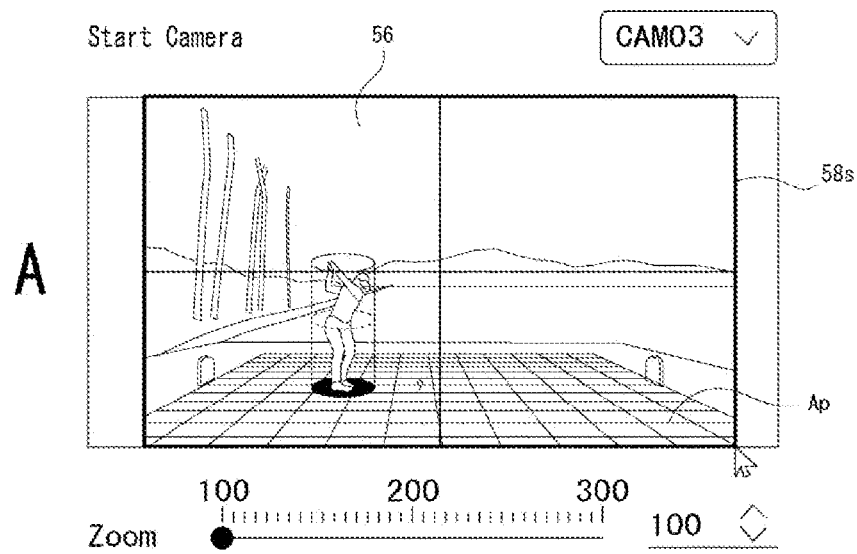
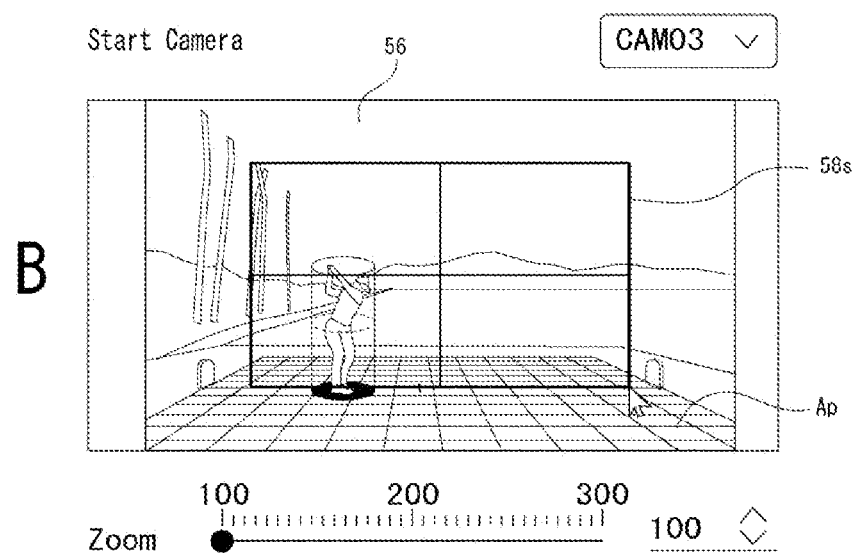

Fig. 27
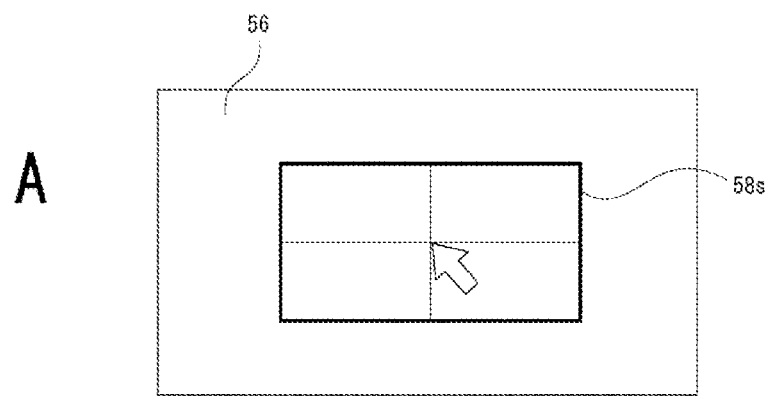
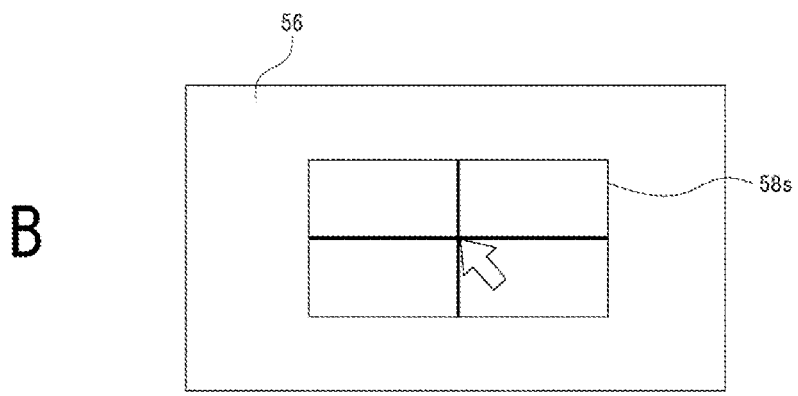

INFORMATION PROCESSING DEVICE, INFORMATION PROCESSING METHOD, PROGRAM, AND DISPLAY SYSTEM

CROSS REFERENCE TO PRIOR APPLICATION

This application is a National Stage Patent Application of PCT International Patent Application No. PCT/JP2022/003043 (filed on Jan. 27, 2022) under 35 U.S.C. § 371, which claims priority to Japanese Patent Application No. 2021-028706 (filed on Feb. 25, 2021), which are all hereby incorporated by reference in their entirety.

TECHNICAL FIELD

The present technology relates to an information processing device, a method thereof, a program, and a display system, and more particularly to a technology for processing a free-viewpoint image that allows a captured subject to be viewed from any viewpoint in a three-dimensional space.

BACKGROUND ART

There is known a technology that based on three-dimensional information representing a captured subject in a three-dimensional space, generates a free-viewpoint image (sometimes referred to as a free-viewpoint video or a virtual viewpoint image (video)) corresponding to an image that allows the captured subject to be viewed from any viewpoint in the three-dimensional space. An example of the related conventional technology can include PTL 1 below. PTL 1 discloses a technology for generating a camera path, which may be referred to as a movement trajectory of a viewpoint.

CITATION LIST

Patent Literature

PTL 1

WO 2018/030206

SUMMARY

Technical Problem

Free-viewpoint images are also useful as broadcast content, and are used, for example, as images to be replayed for sports broadcasts. For example, in the broadcasting of soccer or basketball, a clip of several seconds such as a shot scene is created from images recorded in real time, and is broadcast as an image to be replayed. The "clip" as used in the present disclosure refers to an image of a certain scene, which is created by being extracted from recorded images or further processed.

Incidentally, at a broadcasting site, especially in the case of a live broadcast, a clip for replay is required to be quickly created for an operator and to be broadcast. For example, there is a desire to broadcast a replay ten seconds after a certain play. Such a demand also applies to the creation of clips including free-viewpoint images, and therefore there is a demand for quick creation of free-viewpoint images.

The present technology has been made in view of the above-described circumstances, and an object thereof is to enable quick work of creating a free-viewpoint image.

Solution to Problem

An information processing device according to the present technology includes a display control unit that controls a display of rotation center position information on a target space captured image that is an image in which a real space for which a free-viewpoint image is to be generated is captured, the rotation center position information indicating a position of viewpoint rotation center of the free-viewpoint image.

The space for which the free-viewpoint image is to be generated means a real space in which an object that is the subject of the free-viewpoint image is present. With the above-described configuration, it is possible to visualize and display the position of viewpoint rotation center of the free-viewpoint image on the captured image in which the real space for which the free-viewpoint image is to be generated is captured.

BRIEF DESCRIPTION OF DRAWINGS

FIG. 15 illustrates examples of images captured by an imaging device corresponding to the start viewpoint and the end viewpoint of a free-viewpoint image.

FIG. 16 illustrates image representations of image cropping.

FIG. 22 illustrates an example of a GUI for adjusting the depth of the arc of a viewpoint movement trajectory.

FIG. 23 includes diagrams illustrating specification of the height position of the viewpoint rotation center.

FIG. 25 illustrates an operation example of specifying the position of the viewpoint rotation center (specifying the position in the horizontal direction).

FIG. 26 illustrates an operation example of specifying an image frame for cropping, FIG. 27 illustrates again an operation example of specifying an image frame for cropping.

DESCRIPTION OF EMBODIMENT

Hereinafter, an embodiment will be described in the following order.
<1. System Configuration>
<2. Configuration of Image Creation Controller and Free-Viewpoint Image Server>
<3. Overview of GUI>
<4 Clip Including Free-Viewpoint Image>
<5. Clip Creation Processing>
<6. Camera Varying Detection>
<7. GUI for Free-Viewpoint Image Creation>
<8. Free-Viewpoint Image Generation of Embodiment>
<9. Processing Procedure>
<10. Modification Example>
<11. Summary of Embodiment>
<12. Present Technology>

1. System Configuration

Figure 1:
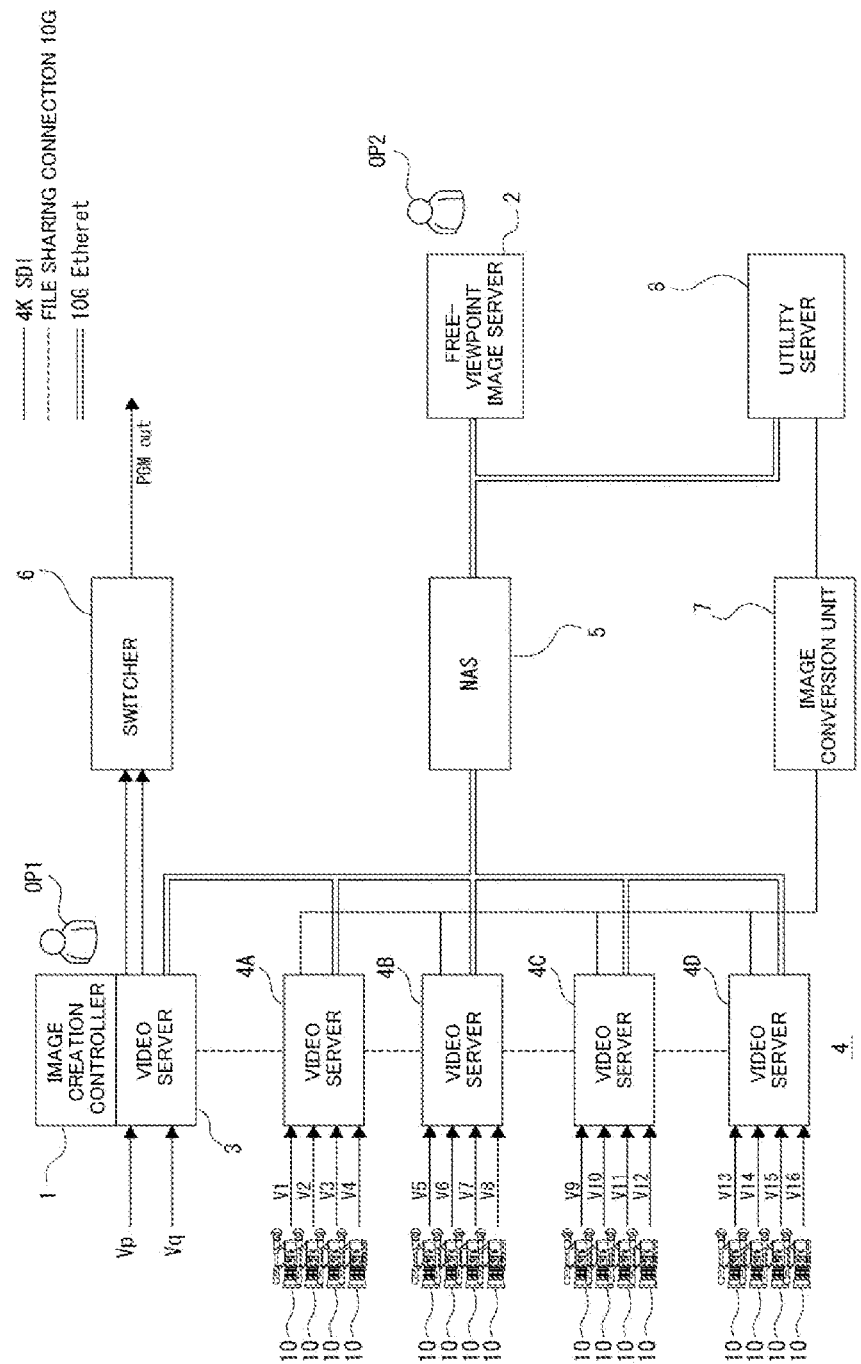
FIG. 1 is a block diagram of a system configuration according to an embodiment of the present technology.

FIG. 1 illustrates a configuration example of an image processing system of an embodiment according to the present technology.

The image processing system includes an image creation controller 1, a free-viewpoint image server 2, a video server 3, a plurality of (for example, four) video servers 4A, 4B, 4C, and 4D, a network attached storage (NAS) 5, a switcher 6, an image conversion unit 7, a utility server 8, and a plurality of (for example, 16) imaging devices 10.

Hereinafter, the term "camera" refers to an imaging device 10. For example, "camera layout" means the layout of the plurality of imaging devices 10. When the video servers 4A, 4B, 4C, and 4) are collectively referred to without particular distinction, they are referred to as the "video server 4".

In this image processing system, based on captured images (for example, image data V1 to V16) acquired from the plurality of imaging devices 10, a free-viewpoint image corresponding to an image as viewed from a viewpoint in a three-dimensional space can be generated, and an output clip that includes the free-viewpoint image can be created.

In FIG. 1, the status of the connection between the respective units is indicated using a solid line, a dashed line, and a double line.

The solid line indicates a connection using serial digital interface (SDI), which is an interface standard for connecting between broadcasting devices such as cameras and switchers, and the connection supports, for example, 4K. Image data is mainly exchanged between the devices via SDI lines.

The double line indicates a connection using a communication standard that builds a computer network, such as 10 Gigabit Ethernet. The image creation controller 1, the free-viewpoint image server 2, the video servers 3, 4A, 4B, 4C, and 4D, the NAS 5, and the utility server 8 are connected via a computer network so that they can exchange image data and various types of control signals with each other.

The dashed lines between the video servers 3 and 4 indicate a state in which the video servers 3 and 4 having an inter-server file sharing function are connected through, for example, a 10G network. Thus, among the video server 3 and the video servers 4A, 4B, 4C, and 4D, each video server can preview and transmit materials in other video servers. In other words, a system using the plurality of video servers is constructed so as to provide efficient highlight editing and transmission.

The imaging devices 10 are each configured as a digital camera device including an imaging element such as a charge coupled device (CCD) sensor or a complementary metal-oxide-semiconductor (CM OS) sensor, and acquire captured images (image data V1 to V16) as digital data. In this example, each imaging device 10 obtains a captured image as a moving image.

In this example, each image capturing device 10 captures a scene of a game such as basketball, soccer, golf, etc., and is disposed at a predetermined position and in a predetermined orientation in a stadium where the game is held. In this example, 16 imaging devices 10 are used. However, at least two or more imaging devices 10 may be used to enable generation of a free-viewpoint image. An increased number of imaging devices 10 to capture images of a target subject from an increased number of angles makes it possible to improve the accuracy of three-dimensional restoration of the subject and improve the image quality of a virtual viewpoint image.

Figure 2:
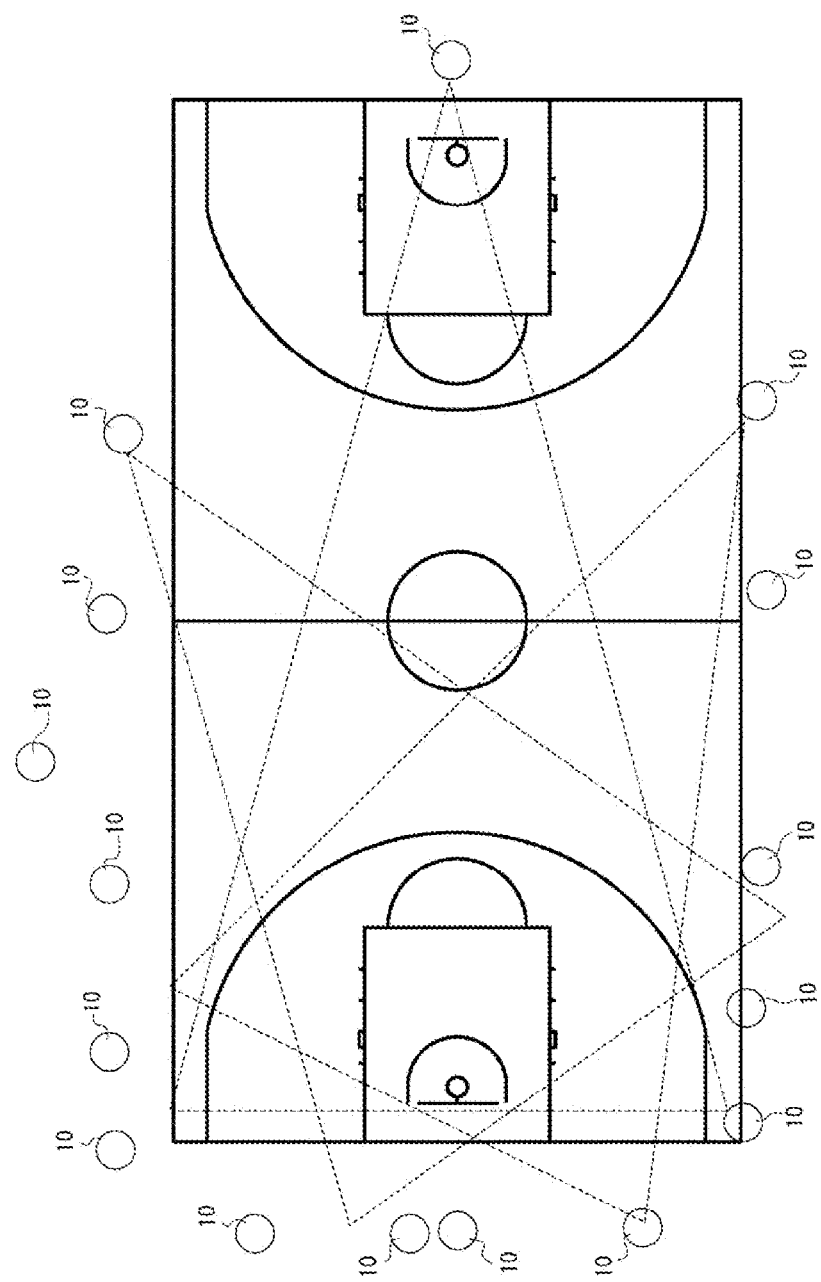
FIG. 2 is a diagram illustrating an example of camera layout for generating a free-viewpoint image according to the embodiment.

FIG. 2 illustrates an example of layout of the imaging devices 10 around a basketball court. Each circle indicates an imaging device 10. For example, this is an example of the camera layout when it is desired to focus on the vicinity of the goal on the left side of the drawing. Of course, the layout and number of cameras are only examples, and they are to be set according to the content and purpose of shooting and broadcasting.

The scene for which a free-viewpoint image is to be generated is not limited to a scene of a basketball game, and may include various scenes.

The image creation controller 1 is configured of an information processing device. This image creation controller 1 can be realized using, for example, a dedicated work station, a general-purpose personal computer, a mobile terminal device, or the like.

The image creation controller 1 controls/manages the operations of the video servers 3 and 4 and performs processing for clip creation.

An example of the image creation controller 1 is a device that can be operated by an operator OP1. The operator OP1, for example, selects a clip content and instructs to create a clip.

The free-viewpoint image server 2 is configured as an information processing device that performs processing of actually creating a free-viewpoint image (a free view (FV) clip, which will be described later) in accordance with an instruction or the like from the image creation controller 1. This free-viewpoint image server 2 can also be realized using, for example, a dedicated work station, a general-purpose personal computer, a mobile terminal device, or the like. An example of the free-viewpoint image server 2 is a device that can be operated by an operator OP2. The operator OP2 does work related to, for example, creating an FV clip as a free-viewpoint image. Specifically, the operator OP2 performs a camera path specification operation (selection operation) to generate a free-viewpoint image. In this example, the operator OP2 also does work to create a camera path.

Camera path information as used herein refers to information including at least information indicating the movement trajectory of a viewpoint in a free-viewpoint image. For example, when an FV clip is created in which the position of a viewpoint, the line-of-sight direction, and the angle of view (focal length) are changed with respect to a subject for which a 3D model has been generated, parameters necessary for determining changes in the movement trajectory of the viewpoint and line-of-sight direction and changes in the angle of view are used as the camera path information.

The configuration and processing of the image creation controller 1 and the free-viewpoint image server 2 will be described later in detail. Although the operators OP1 and OP2 are assumed to perform operations, for example, the image creation controller 1 and the free-viewpoint image server 2 may be arranged side by side so that a single operator can perform operations.

Each of the video servers 3 and 4 is an image recording device, and includes a data recording unit such as a solid state drive (SSD) or a hard disk drive (HDD), and a control unit that performs recording and reproduction control on data in the data recording unit.

Each of the video servers 4A, 4B, 4C, and 4D is capable of receiving, for example, inputs of four systems, and simultaneously records captured images from four imaging devices 10.

For example, the video server 4A records image data V1, V2, V3 and V4. The video server 4B records image data V5, V6, V7 and V8. The video server 46 records image data V9, V10, V11 and V12. The video server 4D records image data V13, V14, V15 and V16.

As a result, the captured images from the 16 imaging devices 10 are all recorded at the same time.

The video servers 4A, 4B, 4C, and 4) perform constant recording, for example, during a sport game to be broadcast.

The video server 3 is directly connected to the image creation controller 1, for example, and is capable of, for example, inputs of two systems and outputs of two systems. Image data Vp and Vq are illustrated as the inputs of two systems.

The image data Vp and Vq to be selected can be captured images from any two of the imaging devices 10 (any two of the image data V1 to V16). Of course, they may be captured images from other imaging devices.

The image data Vp and Vq can be displayed as monitor images on a display by the image creation controller 1. The operator OP1 can check the situation of a scene being shot/recorded for broadcasting, for example, from the image data Vp and Vq input to the video server 3.

Since the video servers 3 and 4 are connected to each other in a file-sharing state, the image creation controller 1 can display for monitoring the captured images from the imaging devices 10, which are recorded in the video servers 4A, 4B, 4C, and 4D, so that the operator OP1 can check them sequentially.

In this example, a time code is attached to the captured image from each imaging device 10 so that frame synchronization can be achieved in processing in the video servers 3, 4A, 4B, 4C, and 4D.

The NAS 5 is a storage device deployed on a network, and is configured of, for example, an SSD or an HDD. In the case of this example, when some frames of the image data V1, V2, ..., V16, which are recorded in the video servers 4A, 4B, 4C, and 4D, are transferred in order to generate a free-viewpoint image, the NAS 5 is a device that stores them for processing in the free-viewpoint image server 2 and stores created free-viewpoint images.

The switcher 6 is a device that receives an image output via the video server 3 and selects a main line image PGMout to be finally selected and broadcast. For example, a broadcast director or the like performs necessary operations.

The image conversion unit 7 performs resolution conversion and synthesis on the image data from the imaging device 10 to generate an image for monitoring the camera layout, and supplies the monitoring image to the utility server 8. For example, 16-system image data (V1 to V16), which are 4K images, are resolution-converted into HD images, and are arranged in tiles to obtain 4-system images, and the 4-system images are supplied to the utility server 8.

The utility server 8, which is a computer device capable of various types of related processing, is especially in this example a device that performs processing of detecting camera movement for calibration. For example, the utility server 8 monitors the image data from the image conversion unit 7 and detects camera movement. The camera movement refers to the movement of the layout position of any one of the imaging devices 10 arranged as illustrated in FIG. 2, for example. The information on the layout position of each imaging device 10 is an important factor in generating a free-viewpoint image, and if the layout position changes, it is necessary to set parameters again. Therefore, the camera movement is monitored.

2. Configuration of Image Creation Controller and Free-Viewpoint Image Server

Figure 3:
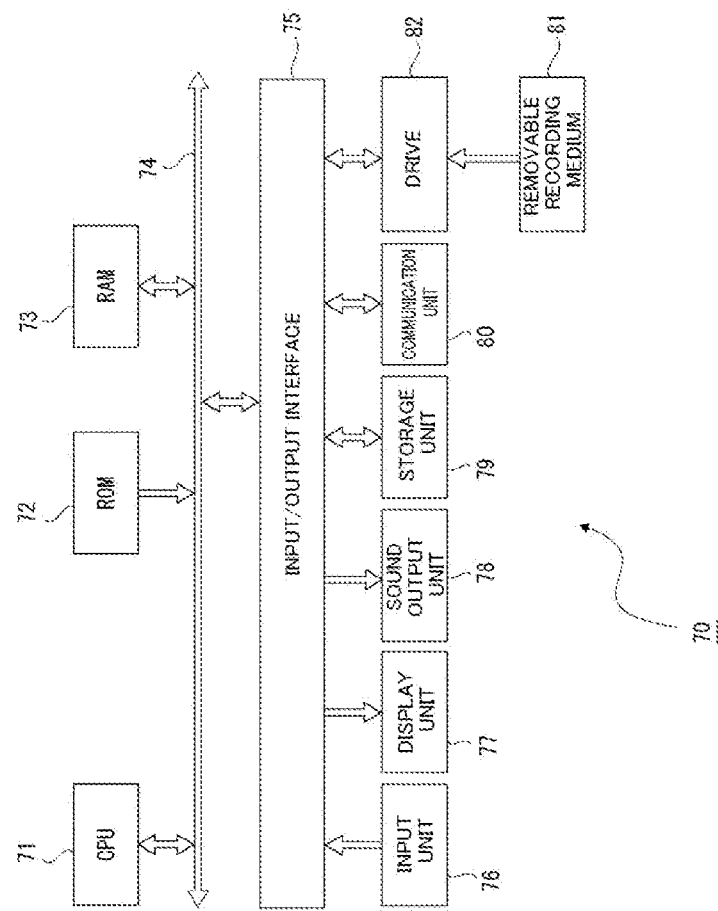
FIG. 3 is a block diagram of a hardware configuration of an information processing device according to the embodiment.

The image creation controller 1, the free-viewpoint image server 2, the video servers 3 and 4, and the utility server 8, which have the above-described configuration, can be implemented as an information processing device 70 having a configuration illustrated in FIG. 3, for example.

In FIG. 3, a CPU 71 of the information processing device 70 executes various types of processing according to a program stored in a ROM 72 or a program loaded from a storage unit 79 into a RAM 73. The PA 73 also appropriately stores data and the like necessary for the CPU 71 to execute various types of processing.

The CPU 71, the ROM 72, and the RAM 73 are connected to each other via a bus 74. An input/output interface 75 is also connected to the bus 74.

An input unit 76 constituted of an operator or an operation device is connected to the input/output interface 75.

For example, various operators or operation devices such as a keyboard, a mouse, keys, a dial, a touch panel, a touch pad, and a remote controller are assumed as the input unit 76.

A user operation is detected by the input unit 76, and a signal corresponding to the input operation is interpreted by the CPU 71.

A display unit 77 constituted of a liquid crystal display (LCD), an organic electro-luminescence (EL) panel, or the like, and a sound output unit 78 constituted of a speaker or the like are connected to the input/output interface 75 as one body or separate bodies.

The display unit 77 is a display unit that performs various displays, and is configured of, for example, a display device provided in the housing of the information processing device 70, or, for example, a separate display device connected to the information processing device 70.

The display unit 77 displays images for various types of image processing, moving images to be processed, and the like on a display screen in accordance with instructions from the CPU 71. The display unit 77 displays various operation menus, icons, and messages, that is, a graphical user interface (GUI) in accordance with instructions from the CPU 71.

The storage unit 79 constituted of a hard disk, a solid-state memory, or the like, or a communication unit 80 constituted of a modem or the like may be connected to the input/output interface 75.

The communication unit 80 performs communication processing via a transmission path such as the Internet and communication such as wired/wireless communication or bus communication with various types of apparatuses.

A drive 82 is also connected to the input/output interface 75 as necessary, and a removable recording medium 81 such as a magnetic disk, an optical disc, a magneto-optical disc, or a semiconductor memory is mounted in the drive 82 as appropriate.

The drive 82 makes it possible to read data files such as an image file MF or various computer programs from the removable recording medium 81. The read data file is stored in the storage unit 79 or an image or a sound included in the data file is output to the display unit 77 or the sound output unit 78. A computer program or the like read from the removable recording medium 81 is installed to the storage unit 79 as necessary.

In this information processing device 70, for example, software can be installed through network communication using the communication unit 80 or via the removable recording medium 81. Alternatively, the software may be stored in advance in the ROM 72, the storage unit 79, or the like.

Figure 4:
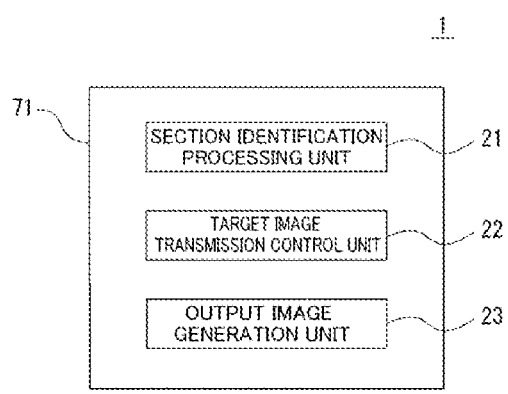
FIG. 4 is a diagram illustrating functions of an image creation controller according to the embodiment.
Figure 5:
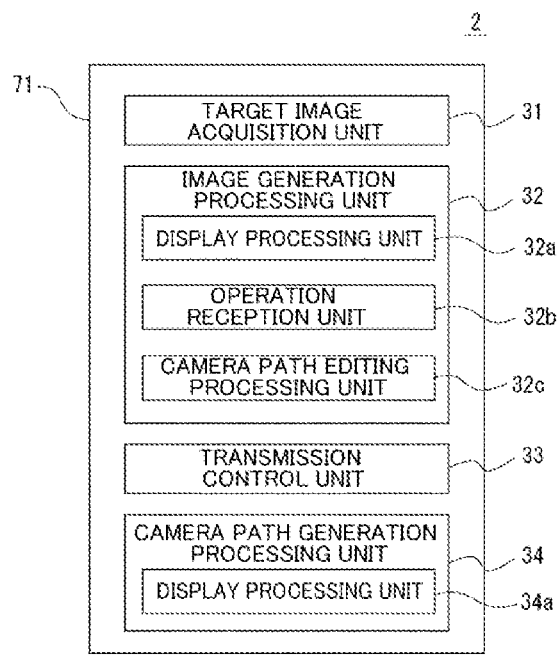
FIG. 5 is a diagram illustrating functions of a free-viewpoint image server according to the embodiment.

In the case where the image creation controller 1 and the free-viewpoint image server 2 are each implemented using such an information processing device 70, processing functions illustrated in FIGS. 4 and 5 are implemented in the CPU 71 by software, for example.

FIG. 4 illustrates, as functions implemented in the CPU 71 of the information processing device 70 serving as the image creation controller 1, a section identification processing unit 21, a target image transmission control unit 22, and an output image generation unit 23.

The section identification processing unit 21 performs, on a plurality of captured images (image data V1 to V16) simultaneously captured by the plurality of imaging devices 10, processing of identifying a generation target image section for which a free-viewpoint image is to be generated. For example, in response to an operation from the operator OP1 to select a scene to be replayed in an image, processing is performed that identifies a time code for that scene, particularly for the section of the scene to be a free-viewpoint image (generation target image section), and notifies the free-viewpoint image server 2 of that time code.

The generation target image section as used herein refers to a frame section that is actually used as a free-viewpoint image. When a free-viewpoint image is generated for one frame in a moving image, the one frame is a generation target image section. In this case, the in-point (start point) and the out-point (end point) for the free-viewpoint image have the same time code.

When a free-viewpoint image is generated for a section of multiple frames in a moving image, the multiple frames are a generation target image section. In this case, the in-point and the out-point for the free-viewpoint image will have different time codes.

Although the structure of a clip will be described later, it is assumed that the in-point and out-point of the generation target image section is different from the in-point and out-point of the finally generated output clip. This is because it is connected with a previous clip and a next clip, which will be described later.

The target image transmission control unit 22 controls transmission of the image data of the generation target image section from each of the plurality of imaging devices 10, that is, one or more frames of the image data V1 to V16, as image data to be used to generate the free-viewpoint image in the free-viewpoint image server z. Specifically, control is performed to transfer the image data as the generation target image section from the video servers 4A, 4B, 4C, and 4D to the NAS 5.

The output image generation unit 23 performs processing of generating an output image (output clip) including the free-viewpoint image (FV clip) generated by and received from the free-viewpoint image server 2.

For example, by the output image generation unit 23 performing the processing, the image creation controller 1 connects on the time axis the FV clip, which is a virtual image generated by the free-viewpoint image server 2, with a previous clip, which is an actual moving image at a time previous to the FV clip and with a next clip, which is an actual moving image at a time subsequent to the FV clip, to generate an output clip. Thus, previous clip+FV clip+next clip gives one output clip.

Of course, previous clip+FV clip may give one output clip.

Alternatively, FV clip+next clip may give one output clip.

An output clip of only the FV clip may be generated without being connected with the previous clip and the next clip.

In any case, the image creation controller 1 generates an output clip including the FV clip and outputs to the switcher 6 the output clip to be used for broadcasting, FIG. 5 illustrates a target image acquisition unit 31, an image generation processing unit 32, a transmission control unit 33, and a camera path generation processing unit 34, which are functions implemented in the CPU 71 of the information processing device 70 serving as the free-viewpoint image server 2.

The target image acquisition unit 31 performs processing of acquiring image data of a generation target image section for which a free-viewpoint image is to be generated, in each of the plurality of captured images (image data V1 to V16) captured simultaneously by the plurality of imaging devices 10. Specifically, the image creation controller 1 acquires, from the video servers 4A, 4B, 4C, and 4D via the NAS 5, image data of one or more frames defined by the in-point and out-point of the generation target image section identified by the function of the section identification processing unit 21, so that the image data can be used to generate a free-viewpoint image.

For example, the target image acquisition unit 31 acquires image data of one or more frames in the generation target image section for all of the image data V1 to V16. The reason why the image data in the generation target image section is acquired for all the image data V1 to V16 is to generate a high-quality free-viewpoint image. As described above, it is possible to generate a free-viewpoint image by using captured images from at least two imaging devices 10. However, an increased number of imaging devices 10 (that is, an increased number of viewpoints) makes it possible to generate a finer 3D model and thus to generate a high-quality free-viewpoint image. Therefore, for example, in a case where 16 imaging devices 10 are arranged, the image data in the generation target image section is acquired for all the image data (V1 to V16) from the 16 imaging devices 10.

The image generation processing unit 32 has a function of generating a free-viewpoint image, that is, an FV clip in this example, by using the image data acquired by the target image acquisition unit 31.

For example, the image generation processing unit 32 performs modeling processing including 3D model generation and subject analysis, and processing such as rendering for generating from a 3D model a free-viewpoint image, which is a two-dimensional image.

The 3D model generation refers to processing of generating, based on the captured images from the imaging devices 10 and camera parameters for the respective imaging devices 10, which are input from for example the utility server 8, 3D model data representing a subject in a three-dimensional space (that is, in which the three-dimensional structure of the subject is restored from the two-dimensional image). Specifically, the 3D model data includes data representing the subject in a three-dimensional coordinate system (X, Y, Z). The subject analysis analyzes the position, orientation, and posture of the subject as a person (player) based on the 3D model data. Specifically, estimation of the position of the subject, generation of a simple model of the subject, estimation of the orientation of the subject, and the like are performed.

Then, a free-viewpoint image is generated based on the 3D model data and the subject analysis information. For example, a free-viewpoint image is generated in which the viewpoint to a 3D model of a player in a stopped state, who is the subject, is moved.

The above-described subject analysis is a kind of image recognition processing of recognizing an object captured in an image.

The viewpoint of the free-viewpoint image will be described with reference to FIG. 6.

Figure 6:
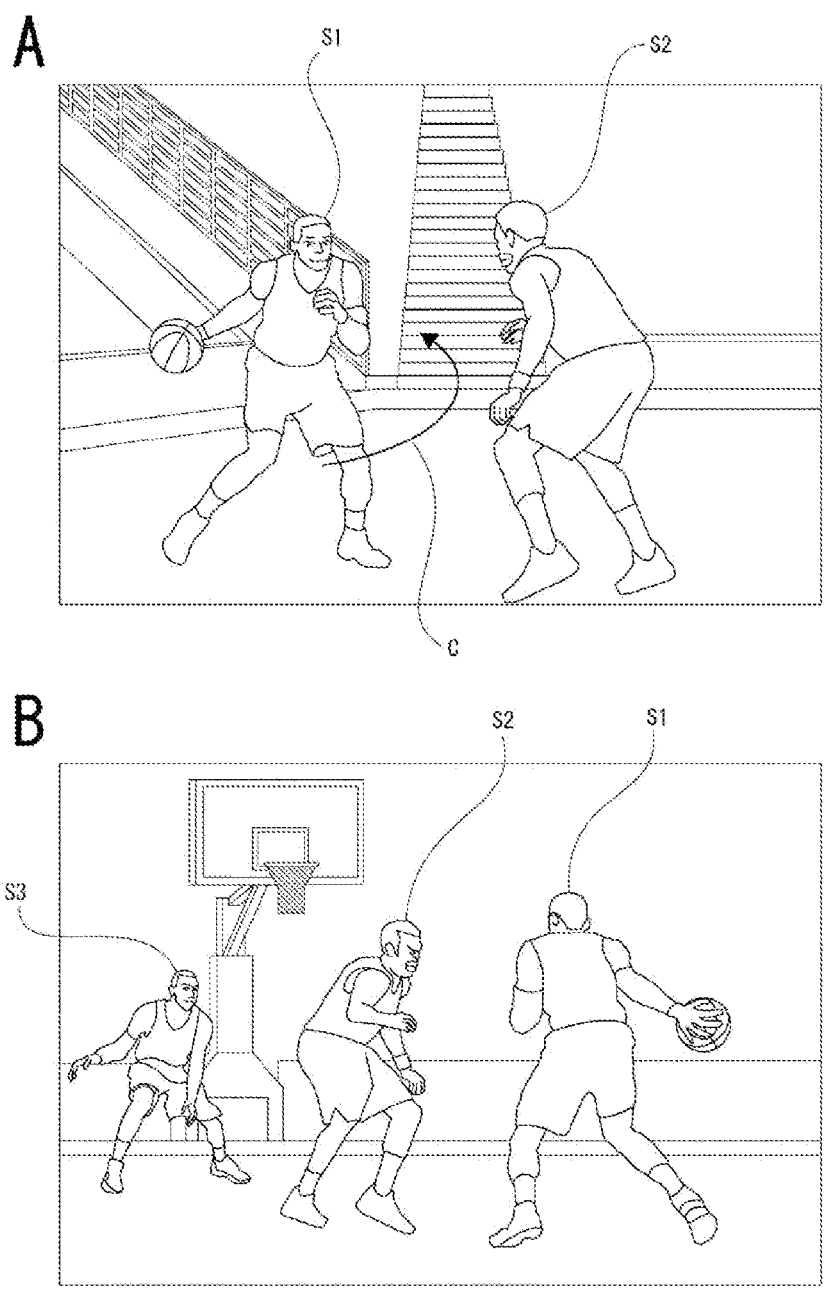
FIG. 6 includes diagrams illustrating viewpoints in a free-viewpoint image according to the embodiment.

In FIG. 6, A illustrates an imagery of a free-viewpoint image in which subjects are captured from a desired viewpoint set on a three-dimensional space. In the free-viewpoint image in this case, a subject S1 is viewed substantially from the front, and a subject S2 is viewed substantially from the back.

In FIG. 6, B illustrates an imagery of a virtual viewpoint image when the position of the viewpoint is changed in the direction of arrow C in A of FIG. 6 and the viewpoint is set such that the subject S1 is viewed substantially from the back. In the free-viewpoint image of B of FIG. 6, the subject S2 is viewed substantially from the front, and a subject S3 and a basketball goal, which do not appear in A of FIG. 6, appears.

For example, as a free-viewpoint image (FV clip), an image of about 1 to 2 seconds is generated in which the viewpoint is gradually moved in the direction of arrow C from the state of A of FIG. 6 so as to reach the state of B of FIG. 6. Of course, variations of the time length of the FV clip as a free-viewpoint image and the trajectory of viewpoint movement are conceivable.

Here, the free-viewpoint image server 2 (CPU 71) of this example functions as a display processing unit 32a and an operation reception unit 32b as some of the functions of the image generation processing unit 32.

The display processing unit 32a performs processing of displaying a generation operation screen Gg for receiving an operation to specify camera path information used to generate a free-viewpoint image, specification of a viewpoint rotation center position described later, an instruction to execute generation of a free-viewpoint image, and the like.

The operation reception unit 32b functions to receive an operation on a preset screen (s.

Details of the camera path related to the free-viewpoint image and the generation operation screen Gg will be described later.

The free-viewpoint image server 2 in this example also functions as a camera path editing processing unit 32c as a part of the functions of the image generation processing unit 32. The function as the camera path editing processing unit 32c will be described later.

The transmission control unit 33 controls transmission of the free-viewpoint image (FV clip) generated by the image generation processing unit 32 to the image creation controller 1 via the NAS 5. Meanwhile, the transmission control unit 33 controls transmission of additional information for generating an output image to the image creation controller 1. The additional information is assumed to be information for specifying the images of the previous clip and/or the next clip. In other words, it is information for specifying which image among the image data V1 to V16 is used to create the previous clip and/or the next clip.

The additional information is also assumed to be information for specifying the time length of the previous clip and/or the next clip.

The camera path generation processing unit 34 performs processing related to generation of camera path information used to generate a free-viewpoint image.

In creating a free-viewpoint image, a plurality of candidate camera paths are created (preset) in advance in order to support various scenes. In order to enable such pre-creation of camera paths, a software program for creating camera paths is installed in the free-viewpoint image server 2 of this example.

The camera path generation processing unit 34 is a function implemented by this software program, and performs processing of generating a camera path in response to an operation input from a user.

The camera path generation processing unit 34 functions as a display processing unit 34*a*. The display processing unit 34*a* performs processing of displaying the preset screen Gs, which will be described later, in order to receive various operation inputs for creating a camera path from the user (the operator OP2 in this example).

3. Overview of GUI

An overview of the generation operation screen Gg used to create a free-viewpoint image and the preset screen (Is used to create a camera path will be described with reference to FIGS. 7 and 8. In this example, the generation operation screen Gg and the preset screen Gs are displayed on the display unit 77 of the free-viewpoint image server 2, for example, and allows for check and operations by the operator OP2.

Figure 7:
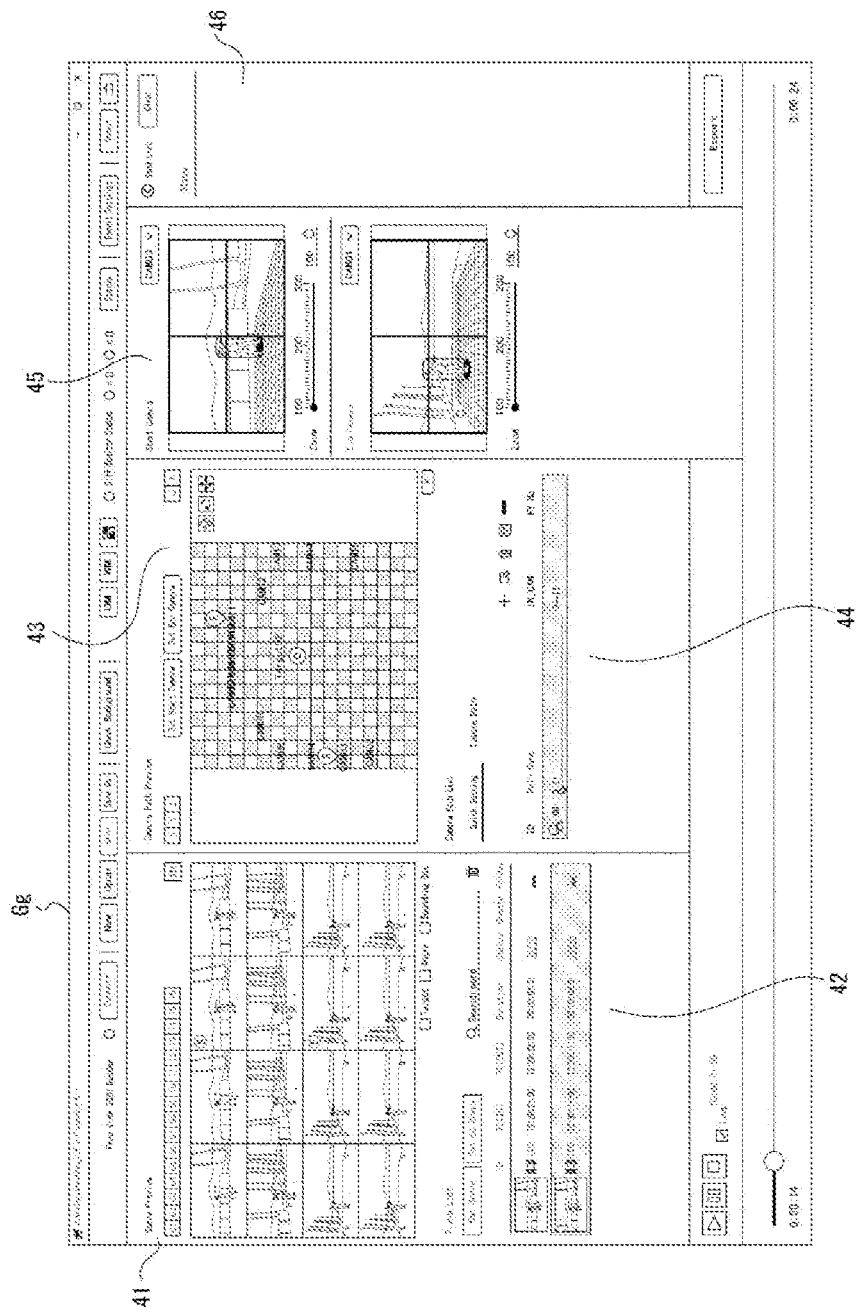
FIG. 7 is a diagram illustrating an overview of a camera path specification screen according to the embodiment.

A scene window 41, a scene list display section 42, a camera path window 43, a camera path list display section 44, a target space image display section 45, and a transmission window 46 are arranged on the generation operation screen Gg illustrated in FIG. 7.

In the scene window 41, for example, an image of a generation target image section is displayed for monitoring so that the operator OP2 can check the content of a scene for which a free-viewpoint image is to be generated.

In the scene list display section 42, a list of scenes specified as generation target image sections, for example, is displayed. The operator OP2 can select scenes to be displayed on the scene window 41 in the scene list display section 42.

In the camera path window 43, the positions of the imaging devices 10 arranged, information indicating a specified camera path, and the like are displayed. As described above, the camera path information is information indicating at least a movement trajectory of a viewpoint in a free-viewpoint image.

In the camera path window 43, information indicating at least a visualized movement trajectory of a viewpoint is displayed as the representation of the camera path.

In the camera path list display section 44, a list of information on various camera paths created and stored in advance is displayed. The operator OP2 can select and specify a camera path to be used to generate an FV clip from among the camera paths displayed in the camera path list display section 44.

In the target space image display section 45, a target space captured image is displayed. The target space captured image means an image in which a real space for which a free-viewpoint image is to be generated is captured. A specific example can be a captured image from at least one of the imaging devices 10 that obtain a plurality of captured images used to generate a free-viewpoint image. In the following description, it is assumed that examples of the target space captured image include a captured image from the imaging device 10 serving as a start camera and a captured image from the imaging device 10 serving as an end camera. The start camera means a camera with the same viewpoint as the start viewpoint of the free-viewpoint image, and the end camera means a camera with the same viewpoint as the end viewpoint of the free-viewpoint image.

As will be described later, in the target space image display section 45, rotation center position information that indicates the position of the viewpoint rotation center of the free-viewpoint image is displayed on the target space captured image, and the user can specify the position of the viewpoint rotation center.

In the transmission window 46, information on transmission of the created FV clip to the image creation controller 1.

Next, the preset screen Gs of FIG. 8 will be described.

Here, as the preset screen Gs for creating camera path information in advance, a preset screen Gs for 2 FV generation is exemplified.

2 FV means that a clip in which after a first FV clip, a captured image (moving image) from the imaging device 10, which is the end viewpoint of the first FV clip, is inserted, and after that, a second FV clip is inserted with that end viewpoint serving as the start viewpoint. Specifically, an example of 2 FV can be, for example, in the case of a golf swing scene, the first FV clip is an FV clip in which: the viewpoint is moved from a viewpoint on the right side of the player to a viewpoint on the front side for a scene of top (top of swing), for example; the subsequent captured image is a moving image (actual captured image) capturing the scene of top to a scene of impact from the viewpoint on the front side; and the second FV clip is an FV clip in which the viewpoint is moved with the viewpoint on the front side serving as the start viewpoint for the scene of impact.

In 2 FV, the camera that is at the end viewpoint of the first FV clip is the same as the camera that is at the start viewpoint of the second FV clip. Such a camera that is at the end viewpoint of the first FV clip and is also at the start viewpoint of the second FV clip is called a "transit camera".

A clip including only one FV clip as an output clip is called "1 FV".

Figure 8:
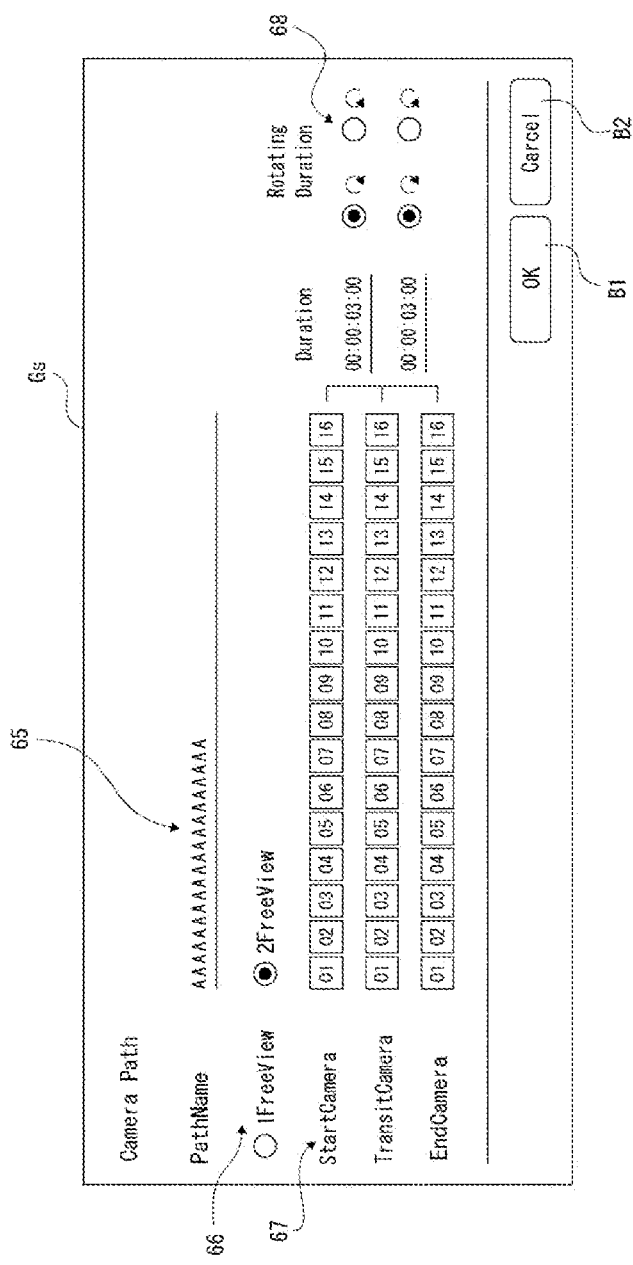
FIG. 8 is a diagram illustrating an overview of a creation operation screen according to the embodiment.

As illustrated in FIG. 8, the preset screen Gs has a path name input section 65 for inputting a name to be assigned to the camera path information, an FV number selection section 66 for selecting 1 FV (1 FreeView) or 2 FV (2 FreeView), a camera selection section 67 for selecting a start camera (StartCamera) and an end camera (EndCamera) for an FV clip, or a transit camera for 2 FV a rotating direction selection section 68 for selecting a rotating direction of viewpoint, an OK button B1, and a cancel button B2.

In the figure, a screen when 2 FV is selected in the FV number selection section 66 is illustrated by way of example. However, when 1 FV is selected, the camera selection section 67 may provide a display such that only the start camera and the end camera are allowed to be selected.

In a case where the plurality of imaging devices 10 are arranged in an annular shape, for example, the rotating direction of the viewpoint is allowed to specify which direction the viewpoint is be moved from the viewpoint of the start camera to the viewpoint of the end camera.

In the figure, the rotating direction selection section 68 is illustrated by way of example when 2 FV is selected. The rotating direction selection section 68 in this case allows for selecting a rotating direction of viewpoint from the start camera to the transit camera (that is, a rotating direction of viewpoint for the first FV clip) and a rotating direction of viewpoint from the transit camera to the end camera (that is, a rotating direction of viewpoint for the second FV clip).

When 1 FV is selected, the rotating direction selection section 68 may provide a display such that at least a rotating direction of viewpoint from the start camera to the end camera is allowed to be selected.

The path name input section 65 allows for entering any characters and numbers. In creating camera path information in this case, the user selects 1 FV or 2 FV on the FV number selection section 66, and for 1 FV, selects which of the imaging devices 10 is to be set for each of the start camera and the end camera on the camera selection section 67. In the figure, the selection of each camera is an example in which the numbers of all candidate cameras (the numbers of the imaging devices 10) are displayed to allow for specifying a camera to be selected from among them. However, the GUI for the selection of each camera is limited to this, and other examples are conceivable, such as directly entering the number or specifying the number with up and down keys.

For 2 FV, the user selects which of the imaging devices 10 is to be set for each of the start camera, the transit camera, and the end camera on the camera selection section 67.

The user also performs an operation to select a viewpoint rotating direction on the rotating direction selection section 68 as necessary.

The user can perform an operation on the OK button B1 to instruct the free-viewpoint image server 2 to set camera path information.

In response to the operation of the OK button B1, the free-viewpoint image server 2 (camera path generation processing unit 34) performs processing of storing in a predetermined storage device (for example, the storage unit 79 of FIG. 3) the numbers of the imaging devices 10 selected as the start camera and the end camera (for 2 FV, and even the number of the transit camera), the information on the rotating direction of viewpoint from the start camera to the end camera (for 2 FV, information on the rotating direction from the start camera to the transit camera and the rotating direction from the transit camera to the end camera), and the name information entered in the path name input section 65 in association with one another.

The cancel button B2 is a button for canceling the creation of the camera path information, and when an operation is performed on the cancel button B2, the free-viewpoint image server 2 (display processing unit 34a) executes predetermined corresponding processing such as processing of closing the preset screen (s, for example.

4. Clip Including Free-Viewpoint Image

Next, an output clip including an FV clip as a free-viewpoint image will be described.

Figure 9:
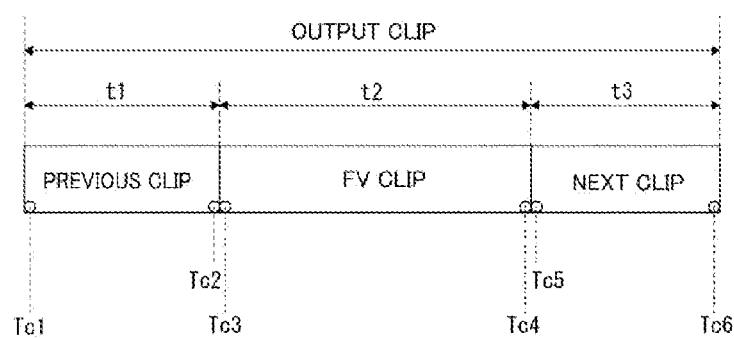
FIG. 9 is a diagram illustrating an output clip according to the embodiment.

FIG. 9 illustrates an example of an output clip in which a previous clip, an FV clip, and a next clip are connected to each other. This corresponds to an example of 1 FV described above.

For example, the previous clip is an actual moving image in a section from time codes TC1 to TC2 in certain image data Vx from among the image data V1 to the image data V16.

The next clip is an actual moving image in a section from time codes TC5 to TC6 in certain image data Vy from among the image data V1 to the image data V16. It is generally assumed that the image data Vx is image data from the imaging device 10 at the start of the viewpoint movement in the FV clip, and the image data Vy is image data from the imaging device 10 at the end of the viewpoint movement in the FV clip.

In this example, the previous clip is a moving image with a time length t1, the FV clip is a free-viewpoint image with a time length t2, and the next clip is a moving image with a time length t3. The playback time length of the entire output clip is t1+t2+t3. For example, it is conceivable that a 5-second output clip includes a 1.5-second moving image, a 2-second free-viewpoint image, and a 1.5-second moving image.

Here, the FV clip is illustrated as a section from time codes TC3 to TC4, which may or may not correspond to the actual number of frames of the moving image. Specifically, this is because for the FV clip, there are cases where the viewpoint is moved with the time of the moving image being stopped (when TC3=TC4), and where the viewpoint is moved without stopping the time of the moving image (when TC3≠TC4).

For the sake of explanation, when the viewpoint is moved with the time of the moving image being stopped (referred to as "time freeze"), the FV clip is referred to as the "still image FV clip", and when the viewpoint is moved without stopping the time of the moving image (referred to as "free run"), the FV clip is referred to as the "moving image FV clip".

Figure 10:
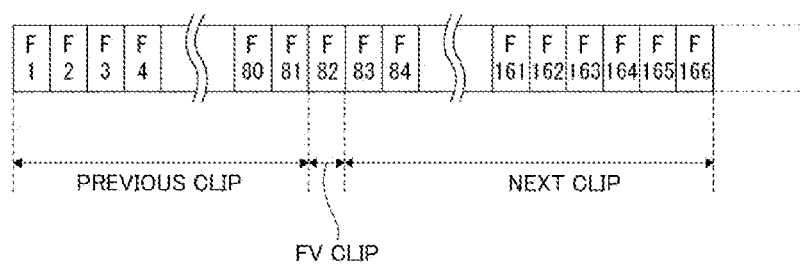
FIG. 10 is a diagram illustrating an output clip including a still image FN clip according to the embodiment.

A still image FV clip with reference to a frame of a moving image is as illustrated in FIG. 10. In this example, the time codes TC1 and TC2 of the previous clip are the time codes of frames F1 and F81, respectively, and the time code of the following frame F82 is the time code TC3=TC4 of FIG. 9. The time codes TC5 and TC6 of the next clips are the time codes of frames F83 and F166, respectively.

In other words, this is the case of generating a free-viewpoint image in which the viewpoint is moved with respect to the one-frame still image of the frame F82.

Figure 11:
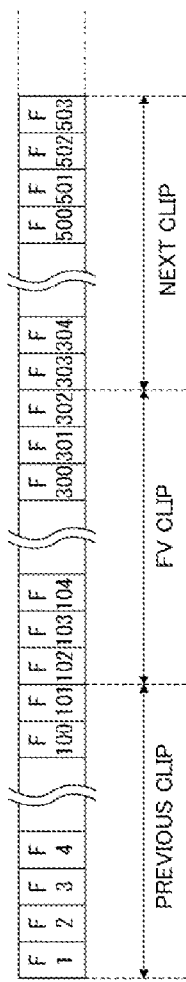
FIG. 11 is a diagram illustrating an output clip including a moving image EV clip according to the embodiment.

On the other hand, a moving image FV clip is as illustrated in FIG. 11. In this example, the time codes TC and TC2 of the previous clip are the time codes of frames F1 and F101, respectively, and the time codes of frames F102 and F302 are the time codes TC3 and TC4 of FIG. 9, respectively. The time codes TC5 and TC6 of the next clips are the time codes of frames F303 and F503, respectively. In other words, this is the case of generating a free-viewpoint image in which the viewpoint is moved with respect to a moving image in a section of the plurality of frames, the frames F102 to F302.

Therefore, the generation target image section determined by the image creation controller 1 is a one-frame section of the frame F82 for the still image FV clip of FIG. 10 being created, and the generation target image section is a section of the plurality of frames, the frames F102 to 302 for the moving image FV clip of FIG. 11 being created.

Figure 12:
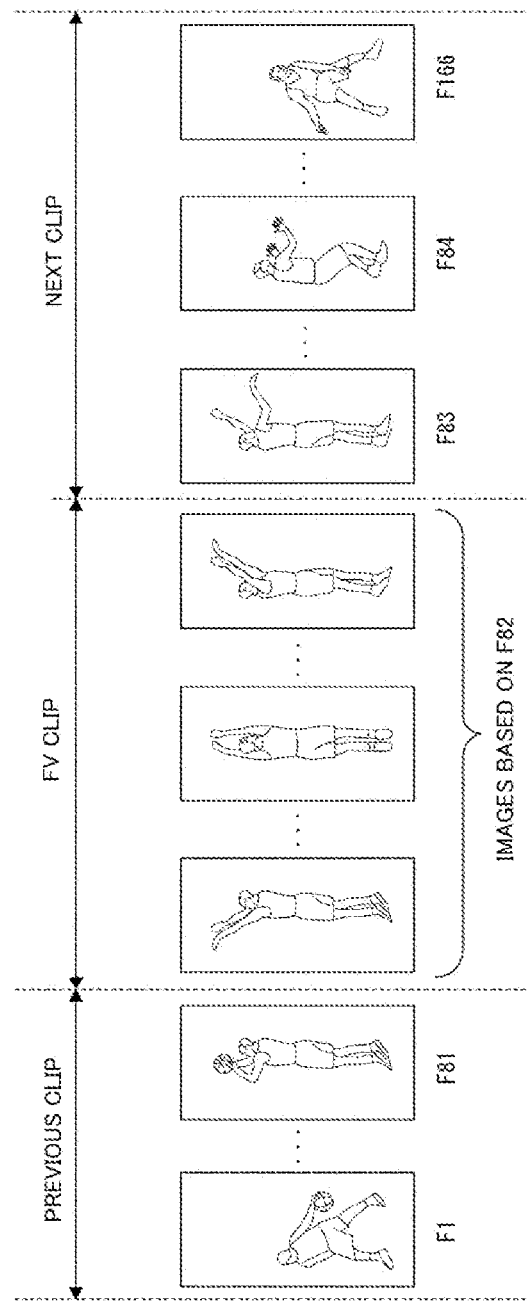
FIG. 12 is a diagram illustrating an image example of an output clip according to the embodiment.

FIG. 12 illustrates an example of the image content of an output clip in the example of the still image FV clip of FIG. 10.

In FIG. 12, the previous clip includes an actual moving image of the frames F1 to F81. The FV clip includes virtual images in which the viewpoint is moved in the scene of frame F82. The next clip includes an actual moving image of the frames F83 to F166.

For example, an output clip including the FV clip is generated in this way and used as an image to be broadcast.

5. Clip Creation Processing

An example of output clip creation processing performed in the image processing system of FIG. 1 will be described below. The following description focuses mainly on the processing of the image creation controller 1 and the free-viewpoint image server 2.

Figure 13:
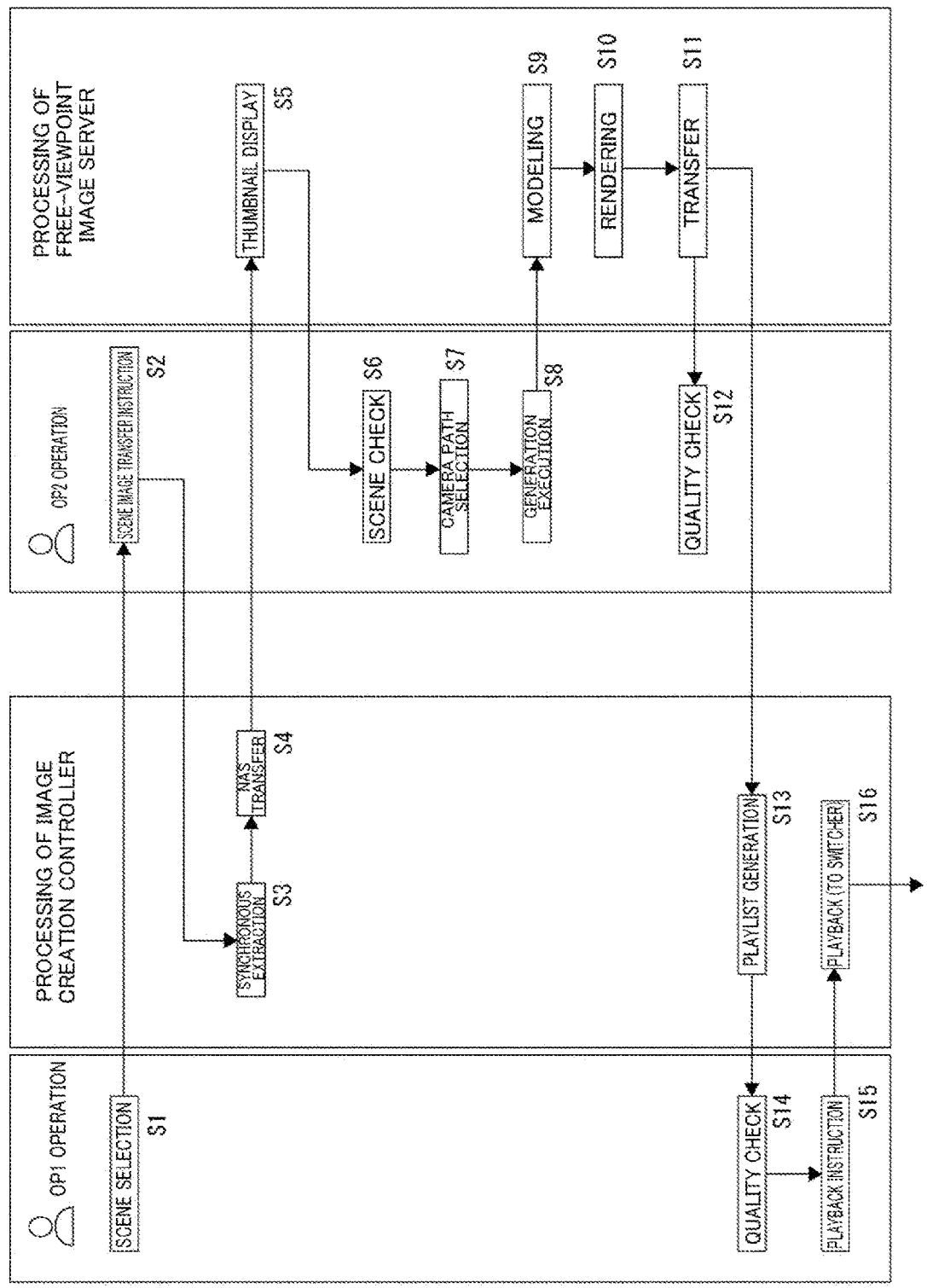
FIG. 13 is a diagram illustrating a work procedure for clip creation according to the embodiment.

First, the flow of processing including operations by the operators OP1 and OP2 will be described with reference to FIG. 13. The processing by the operator OP1 in FIG. 13 collectively indicates GUI processing in the image creation controller 1 and operations by the operator. The processing by the operator OP2 collectively indicates GUI processing in the free-viewpoint image server 2 and operations by the operator.

Step S1: Scene Selection

To create an output clip, the operator OP1 first selects a scene to be an FV clip. For example, the operator OP1 searches for a scene to be used as an FV clip while monitoring captured images displayed on the display unit 77 on the image creation controller 1 side. Then, a generation target image section of one or more frames is selected.

The information on this generation target image section is transmitted to the free-viewpoint image server 2, so that the operator OP2 can recognize that information through the GUI on the display unit 77 on the free-viewpoint image server 2 side.

The information on the generation target image section is specifically the information on the time codes TC3 and TC4 of FIG. 9. As described above, for the still image FV clip, the time code TC3=TC4 is given.

Step S2: Scene Image Transfer Instruction

The operator OP2 performs an operation to instruct to transfer the image of the corresponding scene in accordance with the specification of the generation target image section. In response to this operation, the free-viewpoint image server 2 transmits a transfer request for the image data in the section of the time codes TC3 and TC4 to the image creation controller 1.

Step S3: Synchronous Extraction

In response to the transfer request for the image data, the image creation controller 1 controls the video servers 4A, 4B, 4C, and 4D to extract the section of the time codes TC3 and TC4 for each of the 1.6 systems of image data of the image data V1 to V16.

Step S4: NAS Transfer

Then, the image creation controller 1 causes them to transfer the data of the section of the time codes TC3 and TC4 for all the image data V1 to V16 to the NAS 5.

Step S5: Thumbnail Display

The free-viewpoint image server 2 displays thumbnails of the image data V1 to V16 of the time codes TC3 and TC4 transferred to the NAS 5.

Step S6: Scene Check

The operator OP2 checks the scene content of the section indicated by the time codes TC3 and TC4 on the operation screen Gg provided by the free-viewpoint image server 2.

Step S7: Camera Path Selection

The operator OP2 selects (specifies) on the generation operation screen Gg a camera path considered appropriate with reference to the scene content.

Step S8: Generation Execution

After selecting the camera path, the operator OP2 performs an operation to execute generation of an FV clip.

Step S9: Modeling

The free-viewpoint image server 2 uses the frame data in the section of the time codes TC3 and TC4 for each of the image data V1 to V16 and parameters such as the layout position of each imaging device 10 input in advance, to generate a 3D image of a subject, perform subject analysis, and the like.

Step S10: Rendering

The free-viewpoint image server 2 generates a free-viewpoint image based on the 3D model data and the subject analysis information. The free-viewpoint image is generated so that the viewpoint is moved based on the camera path selected in step S7.

Step S11: Transfer

The free-viewpoint image server 2 transfers the generated FV clip to the image creation controller 1. At this time, it is possible to transmit not only the FV clip but also additional information including specification information of the previous clip and the next clip and specification information of the time lengths of the previous clip and the next clip.

Step S12: Quality Check

On the free-viewpoint image server 2 side, the operator OP2 can check the quality before or after the transfer of step S11. Specifically, the free-viewpoint image server 2 plays and displays the generated FV clip on the generation operation screen Gg so that the operator OP2 can check it. Depending on the circumstances, it is possible for the operator OP2 to redo the generation of the FV clip without executing the transfer.

Step S13: Playlist Generation

The image creation controller 1 uses the transmitted FV clip to generate an output clip. In this case, the output clip is generated by combining one or both of the previous clip and the next clip with the FV clip on the time axis.

This output clip may be generated as stream data in which each frame serving as the previous clip, each frame virtually generated as the FV clip, and each frame serving as the next clip are actually connected to each other in time series. On the other hand, in this processing example, they are virtually connected to each other as a playlist.

Specifically, a playlist is generated such that the FV clip is played and the frame section as the previous clip is then played. This makes it possible to play the output clip without generating actually connected stream data serving as an output clip.

Step S14: Quality Check

Playback based on the playlist is performed through the GUI on the image creation controller 1 side, and the operator OP1 checks the content of the output clip.

Step S15: Playback Instruction

The operator OP1 issues a playback instruction through a predetermined operation in response to the quality check. The image creation controller 1 recognizes the input of the playback instruction.

Step S16: Playback

The image creation controller 1 supplies the output clip to the switcher 6 in response to the playback instruction. This makes it possible to broadcast the output clip.

6. Camera Varying Detection

Since a 3D model is generated using the image data V1, V2, . . . , V16 in order to generate a free-viewpoint image, the parameters including position information of the imaging devices 10 are important.

For example, when the position of a certain imaging device 10 is moved during broadcasting, or when the imaging direction is changed such as in the panning direction or the tilting direction, then parameter calibration is required accordingly. For this reason, in the image processing system of FIG. 1, the utility server 8 detects a variation in a camera. The variation in a camera as referred to here means that at least one of the position and the imaging direction of a camera changes.

Figure 14:
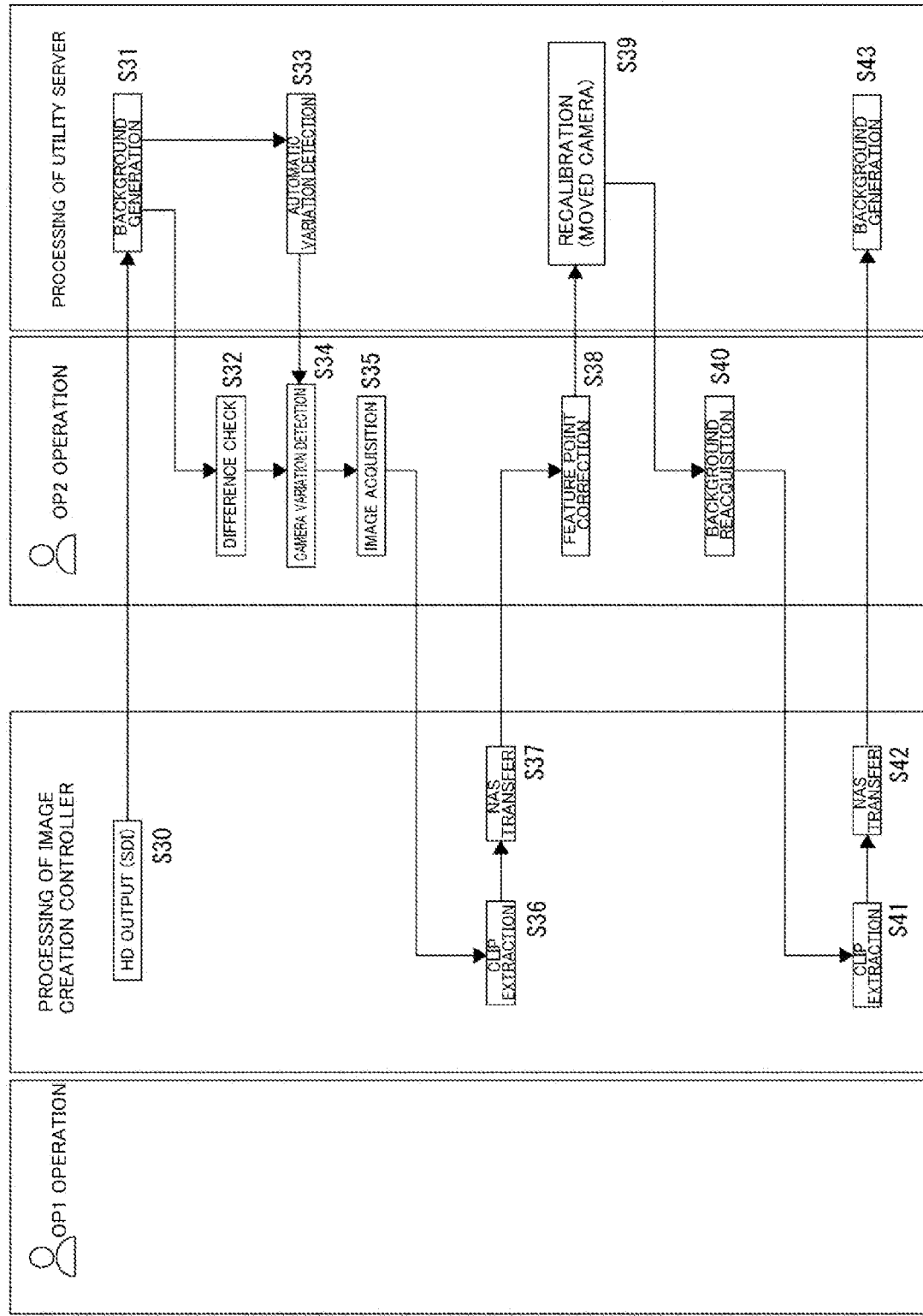
FIG. 14 is a diagram illustrating a work procedure for camera variation detection according to the embodiment.

A processing procedure of the image creation controller 1 and the utility server 8 to detect a variation in a camera will be described with reference to FIG. 14. Although FIG. 14 illustrates the processing procedure in the same format as in FIG. 13, it is an example in which the operator OP2 also operates the utility server 8.

Step S30: HD Output

The image creation controller 1 controls the video servers 4A, 4B, 4C, and 4D to output the image data to the image conversion unit 7 in order to detect a variation in a camera. The images from the video servers 4A, 4B, 4C, and 4D, that is, the images from the 16 imaging devices 10, are resolution-converted by the image conversion unit 7 and then supplied to the utility server 8.

Step S31: Background Generation

The utility server 8 generates a background image based on the supplied images. The background image is an image that does not change unless there is no variation in a camera, a background image excluding subjects such as players is generated for 16 systems of image data (V1 to V16).

Step S32: Difference Check

The background image is displayed on the GUI, so that the operator OP2 can check a change in the image.

Step S33: Automatic Variation Detection

It is also possible to automatically detect a variation in a camera by comparing background images at each point in time.

Step S34: Camera Variation Detection

As a result of step S33 or step S32 described above, a variation in a certain imaging device 10 is detected.

Step S35: Image Acquisition

Calibration is required in response to detection of a variation in an imaging device 10. Therefore, the utility server 8 requests the image creation controller 1 for the image data after the variation.

Step S36: Clip Extraction

In response to the request to acquire the image from the utility server 8, the image creation controller 1 controls the video servers 4A, 4B, 4C, and 4D to execute clip extraction for the image data V1 to V16.

Step S37: NAS Transfer

The image creation controller 1 controls the video servers 4A, 4B, 4C, and 4D to transfer the image data extracted as clips to the NAS 5.

Step S38: Feature Point Correction

By the transfer to the NAS 5, the utility server 8 can refer to and display the image after the camera varies. The operator OP2 performs operations necessary for calibration such as correction of feature points.

Step S39: Recalibration

The utility server 8 executes again calibration for 3D model generation using the image data (V1 to V16) after the camera varies.

Step S40: Background Reacquisition

After the calibration, the utility server 8 makes a request to acquire the image data for the background image again in response to the operations of the operator OP2.

Step S41: Clip Extraction

In response to the request to acquire the image from the utility server 8, the image creation controller 1 controls the video servers 4A, 4B, 4C, and 4D to execute clip extraction for the image data V1 to V16.

Step S42: NAS Transfer

The image creation controller 1 controls the video servers 4A, 4B, 4C, and 4D to transfer the image data extracted as clips to the NAS 5.

Step S43: Background Generation

The utility server 8 uses the image data transferred to the NAS 5 to generate a background image. This background image serves as, for example, a reference for subsequent camera variation detection.

For example, by performing the camera variation detection and the calibration as in the above-described procedure, even if the position or imaging direction of an imaging device 10 changes during broadcasting, the parameters are corrected accordingly. Therefore, an accurate IV clip can be continuously generated.

7. GUI for Free-Viewpoint Image Creation

In a case where a fixed camera, that is, a camera whose position and orientation are fixed is used as the imaging device 10 to acquire a captured image for generating a free-viewpoint image, it can be guaranteed that a subject of interest, such as a specific player to be mainly focused in the free-viewpoint image, is positioned at the center of the image frame, resulting in the rotation of the viewpoint around a position different from the position of the subject of interest as the viewpoint rotation center. As a result, an unnatural free-viewpoint image will be generated.

FIG. 15 illustrates examples of captured images from the imaging devices 10 corresponding to the start viewpoint and the end viewpoint of a free-viewpoint image. In FIG. 15, A illustrates an example of a captured image from the imaging device 10 that is at the start viewpoint, and B illustrates an example of a captured image from the imaging device 10 that is at the end viewpoint.

These examples indicate a scene of a golf tee shot. In this case, it is not clear at which position on the tee ground a player as a subject of interest will stand, and thus, if the position and orientation of each imaging device 10 is fixed, the subject of interest may fail to be captured in the center of the image frame. In this case, if the rotation center of the viewpoint is set at the center of the image frame (the position in the three-dimensional space) and then the viewpoint is moved, an unnatural free-viewpoint image may be generated.

Therefore, in the present embodiment, to generate a free-viewpoint image, an operation to specify the position of the viewpoint rotation center is received. For example, by specifying the position of the viewpoint rotation center as the position of the subject of interest, a free-viewpoint image can be obtained in which the viewpoint is moved around the position of the subject of interest.

In this example, when the image size of the captured image from the imaging device 10 is the original size, the free-viewpoint image is generated as an image that is a smaller size image that is cropped (cut out) from the original size image.

FIG. 16 illustrates examples of imagery of image cropping. FIG. 16 illustrates cropping from the image illustrated in A of FIG. 15, and in FIG. 16, B illustrates cropping from the image illustrated in B of FIG. 15.

In these examples, the above-described original size is a 4 k size, and the image size of the free-viewpoint image is a full HD (FHD) size.

Even if the subject of interest is captured at a position far removed from the center of the image frame in the original size image, cropping as described above makes it possible for the subject of interest to be positioned close to the center of the image frame in the free-viewpoint image.

In the above situation, an example of a GUI for creating a free-viewpoint image will be described with reference to FIGS. 17 to 29. FIGS. 17 to 29 illustrate examples of screens for 1 FV as examples of the generation operation screen Gg.

Figure 17:
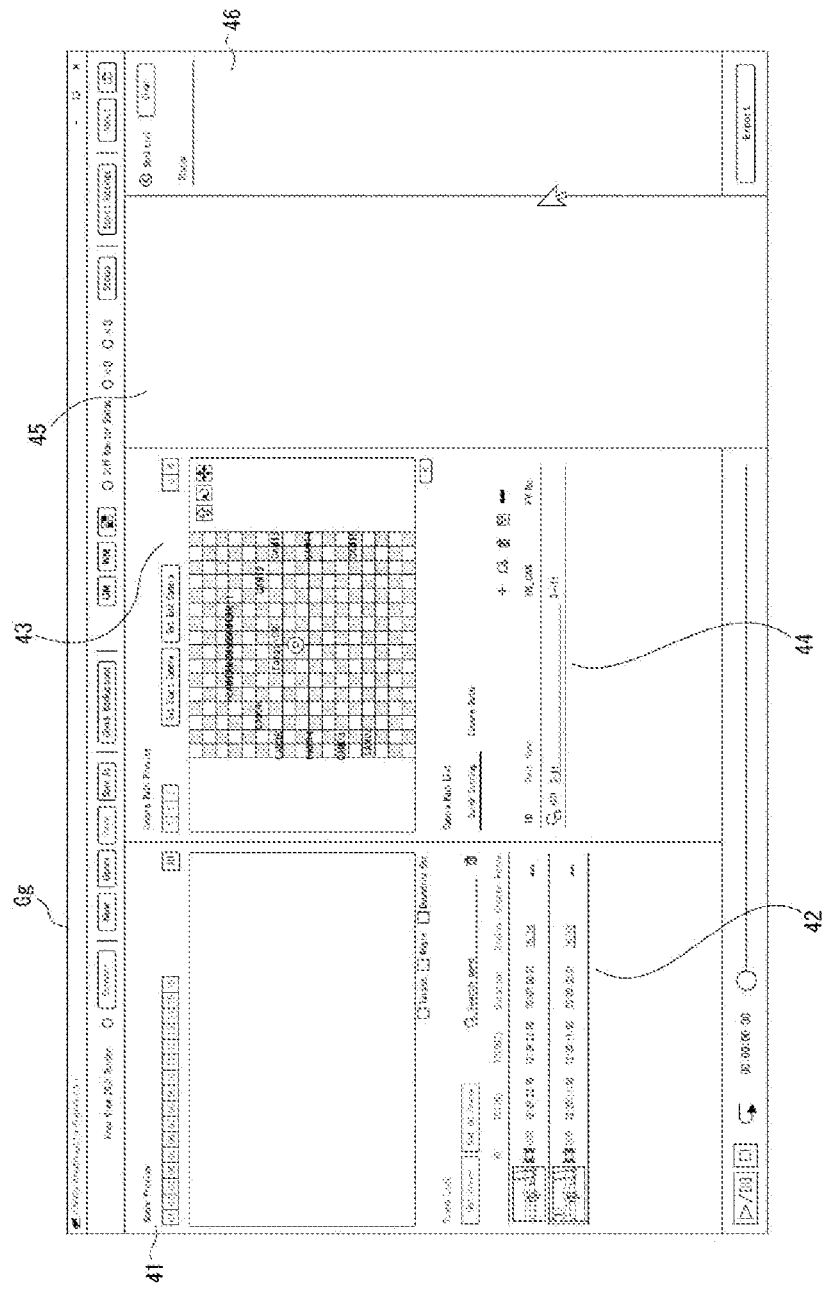
FIG. 17 illustrates an example of an initial screen of a generation operation screen.

FIG. 17 illustrates an example of an initial screen of the generation operation screen Gg.

As described above, the scene window 41, the scene list display section 42, the camera path window 43, the camera path list display section 44, the target space image display section 45, and the transmission window 46 are arranged on the generation operation screen Gg.

The scene window 41 is a display area in which an image of a generation target image section as described above is displayed for monitoring so that the user (the operator OP2 in this example) can check the content of a scene for which a free-viewpoint image is to be generated. On the initial screen, no image is displayed in the scene window 41 because no image is specified for the generation target image section.

In the scene list display section 42, a list of scenes specified as generation target image sections, for example, is displayed. The user can specify from the list of scenes displayed on the scene list display section 42 a scene for which a free-viewpoint image is to be generated.

Figure 18:
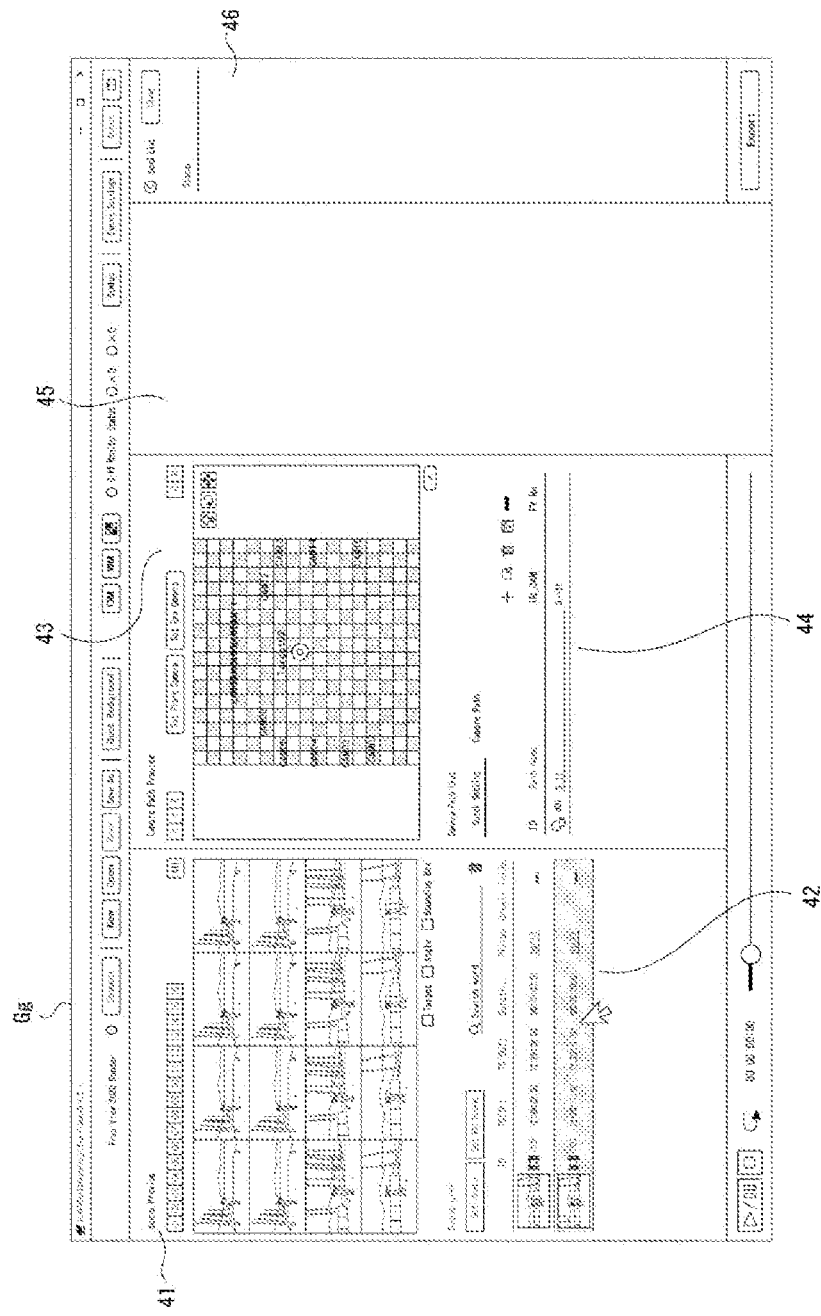
FIG. 18 illustrates an example of a state of the generation operation screen after scene specification.

FIG. 18 illustrates an example of a state of the generation operation screen Gg after scene specification.

When a scene is specified on the scene list display section 42, captured images from the imaging devices 10 for the specified scene are displayed in the scene window 41. This allows the user to easily understand in what composition each imaging device 10 captures the subject of interest on the generation operation screen Gg.

In the camera path list display section 44 on the generation operation screen Gg, a list of camera path information that has been created and stored in advance is displayed. Specifically, in this example, a list of camera path information preset by the user through the preset screen Gs described above (FIG. 8) is displayed. To create a free-viewpoint image, the user performs an operation to specify a desired camera path from among the camera paths displayed in the camera path list display section 44. In the figure, an example is given in which there is only one camera path preset, and only one piece of camera path information is displayed in the camera path list display section 44.

Figure 19:
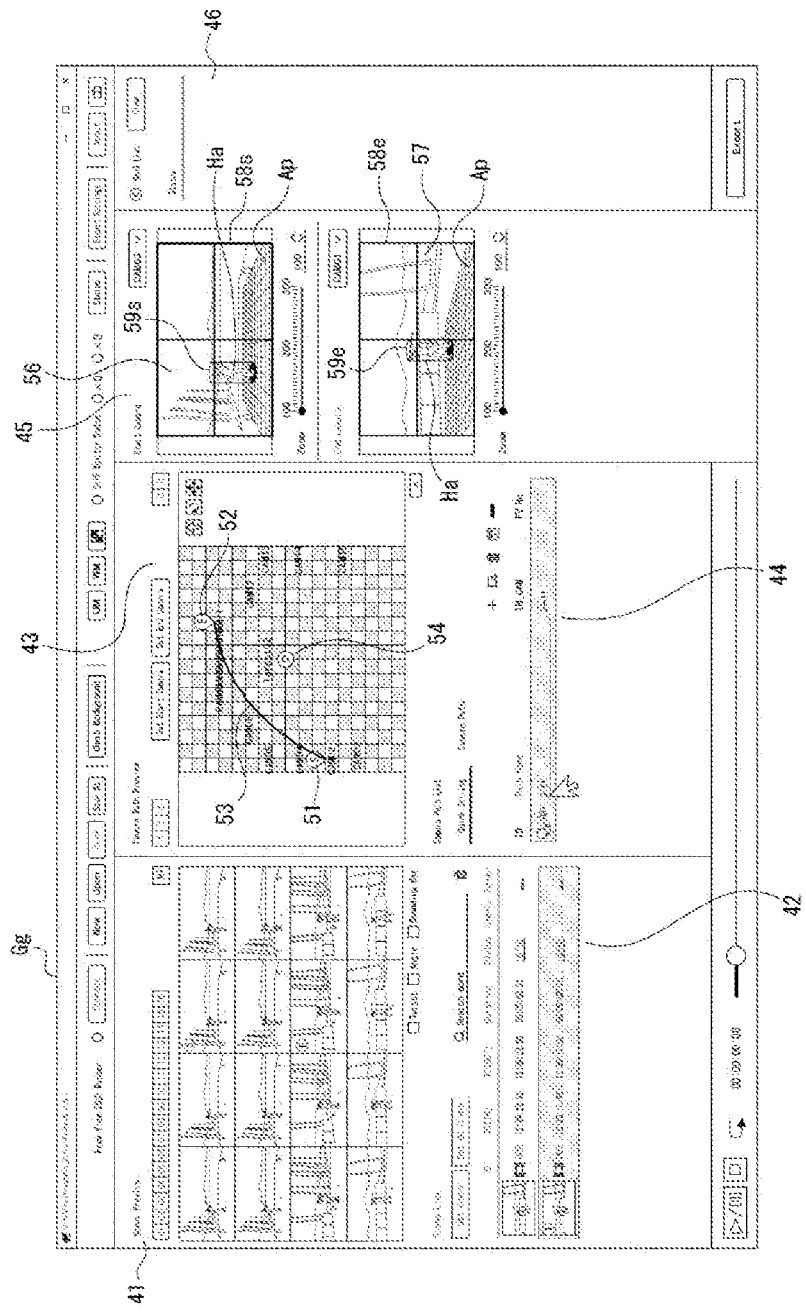
FIG. 19 illustrates an example of a state of the generation operation screen when a camera path is specified in a camera path list display section.

FIG. 19 illustrates an example of a state of the generation operation screen Gg when a camera path is specified in the camera path list display section 44. When a camera path is specified in the camera path list display section 44, information is displayed in the camera path window 43 according to the information on the specified camera path. Specifically, displayed are start camera position information 51 that is information indicating the position of the start camera, end camera position information 52 that is information indicating the position of the end camera, viewpoint movement trajectory information 53 that is information indicating a movement trajectory of the viewpoint in the free-viewpoint image, and rotation center position information 54 that is information indicating the position of the viewpoint rotation center of the free-viewpoint image.

Immediately after the camera path is specified in the camera path list display section 44, the rotation center position information 54 is displayed at a position indicating a predetermined initial position.

Further, when the camera path is specified in the camera path list display section 44, in the scene window 41, the captured image from the imaging device 10 corresponding to the start camera and the captured image from the imaging device 10 corresponding to the end camera are marked with a start camera mark (for example, "S" mark) and an end camera mark (for example, "E" mark), respectively, based on the information on the numbers of the start camera and the end camera included in the information on the specified camera path.

Furthermore, when the camera path is specified in the camera path list display section 44, in the target space image display section 45, the captured image from the imaging device 10 corresponding to the start camera and the captured image from the imaging device 10 corresponding to the end camera are displayed as target space captured images based on the information on the numbers of the start camera and the end camera included in the information on the specified camera path.

Specifically, the target space image display section 45 has a start camera image display area 56 where the captured image from the start camera is to be displayed and an end camera image display area 57 where the captured image from the end camera is to be displayed. The captured image from the imaging device 10 corresponding to the start camera and the captured image from the imaging device 10 corresponding to the end camera are displayed in their respective areas.

In each of the start camera image display area 56 and the end camera image display area 57, image frame information 58, rotation center position information 59, and specifiable range information Ap are displayed on the target space captured image.

The image frame information 58 is information indicating an image frame for an FV clip to be generated, and the rotation center position information 59 is information indicating the position of the viewpoint rotation center of the FV clip. When the image frame information 58 and the rotation center position information 59 displayed in the start camera image display area 56 is distinguished from those displayed in the end camera image display area 57, they are represented as image frame information 58s and rotation center position information 59s, respectively. In addition, the image frame information 58 and the rotation center position information 59 displayed in the end camera image display area 57 are represented as image frame information 58e and rotation center position information 59e, respectively.

Figure 20:
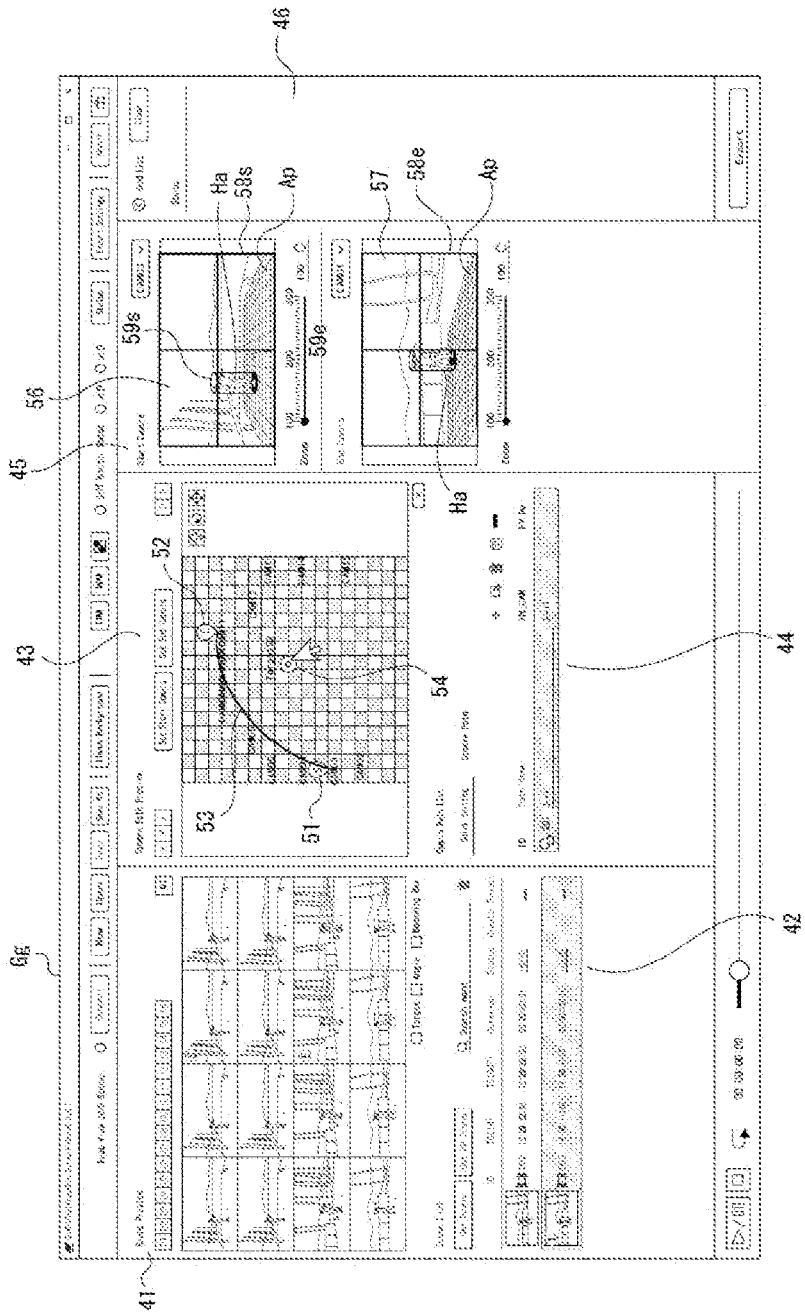
FIG. 20 illustrates an example of specifying the position of a viewpoint rotation center through an operation of rotation center position information in a camera path window.

The rotation center position information 59 displayed in the target space image display section 45 is also displayed at a predetermined initial position immediately after the camera path is specified, as with the rotation center position information 54 described above. FIG. 20 illustrates an example in which the initial position substantially matches the position of the subject of interest. However, of course, the initial position does not necessarily match the position of the subject of interest.

The specifiable range information Ap is information indicating a specifiable range of the viewpoint rotation center position of the FV clip.

If the viewpoint rotation center is allowed to be specified in a wide range, the range in which a 3D model used to generate a free-viewpoint image is to be generated becomes wide, which may require a large number of imaging devices 10 to be prepared or may result in excessive processing load. Therefore, in the present embodiment, the range in which the viewpoint rotation center can be set is predetermined as a specifiable range.

In this example, the specifiable range is set as a range calculated in advance by the user based on the number and layout of the imaging devices 10 actually arranged.

The specifiable range of the viewpoint rotation center may be adjustable based on an operation by the user. The specifiable range information Ap may be calculated by a computer device based on the number of imaging devices 10 actually arranged and the layout of them.

In the present embodiment, the position of the viewpoint rotation center can be specified by an operation of the rotation center position information 59s and 59e in the target space image display section 45 as will be described later. However, in this example, the position of the viewpoint rotation center can be specified by an operation of the rotation center position information 54 displayed in the camera path window 43.

Figure 21:
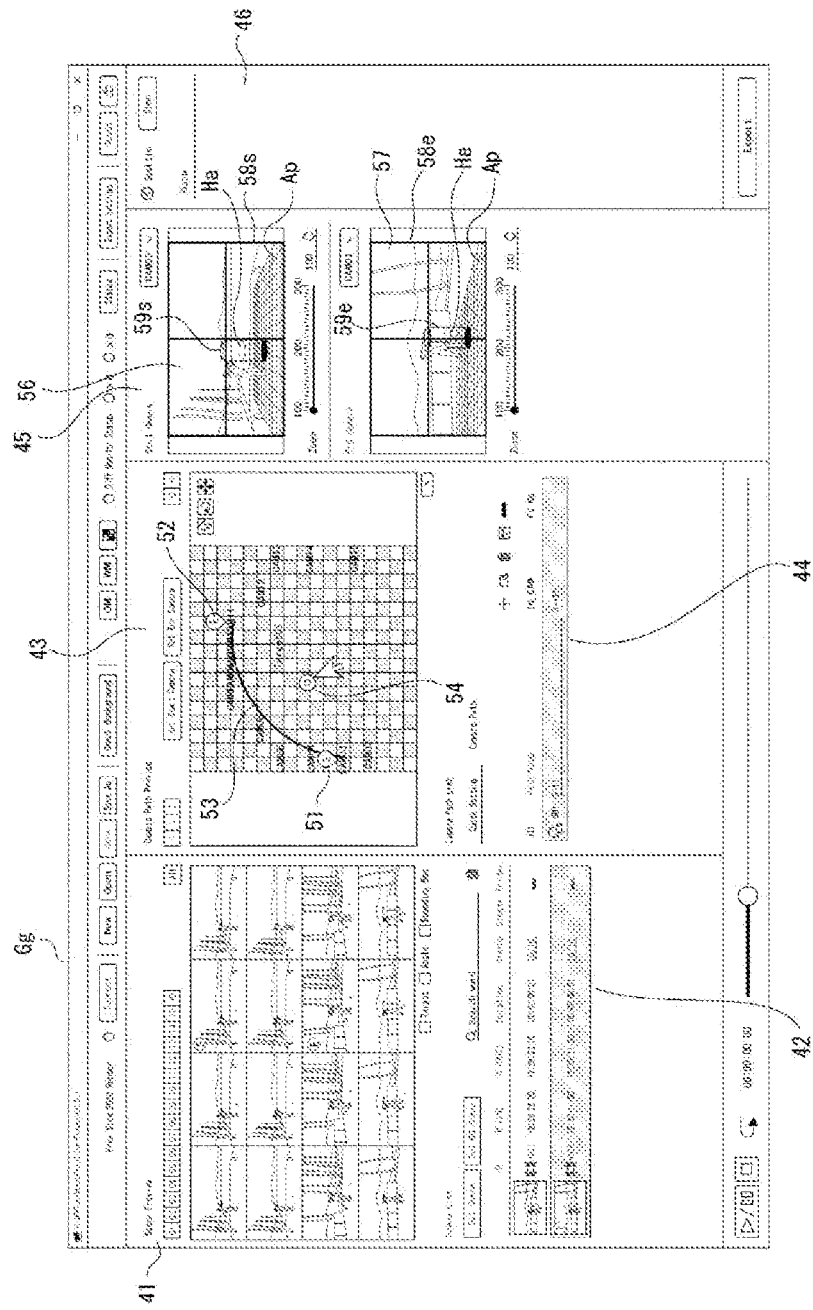
FIG. 21 illustrates again an example of specifying the position of the viewpoint rotation center through an operation of rotation center position information in the camera path window.

Specifically, the position of the viewpoint rotation center can be specified by an operation to move the rotation center position information 54, for example, a drag-and-drop operation, as illustrated in the transition from FIGS. 20 to 21.

In this example, in response to the operation to move the rotation center position information 54 as described above, the rotation center position information 59s and 59e in the target space image display section 45 is moved in conjunction with the movement of the rotation center position information 54, as illustrated in the transition from FIGS. 20 to 21. This conjunctive movement of the rotation center position information 59s and 59e in the target space image display section 45 makes it possible for the user to easily imagine where the viewpoint rotation center position is located even in response to an operation to specify the position in the camera path window 43 because the rotation center position information 59s and 59e is moved in the target space captured image.

In specifying the position of the viewpoint rotation center by an operation of the rotation center position information 54 in the camera path window 43, the position of the viewpoint rotation center of each of the start camera and the end camera is the same as the position specified in the camera path window 43.

In this example, the specification of the position of the viewpoint rotation center is limited to within the specifiable range indicated by the above-described specifiable range information Ap.

Specifically, the operation reception unit 32b (see FIG. 5) in the free-viewpoint image server 2 receives only an operation to specify the position of the viewpoint rotation center within the specifiable range as a valid position specification operation.

As an example, it is conceivable that the movable range of the rotation center position information 54 is limited to only within the specifiable range. For example, even when an attempt is made to move the rotation center position information 54 outside the specifiable range, the movement of the rotation center position information 54 may be stopped at the time when the rotation center position information 54 is positioned at the end of the specifiable range. Alternatively, the movement of the rotation center position information 54 outside the specifiable range may be permitted, but the rotation center position information 54 may be returned to the specifiable range after a predetermined period of time.

This reception of only the position specification operation for the viewpoint rotation center within the specifiable range as a valid position specification operation is the same for the position specification operations using the rotation center position information 59s and 59e, which will be described later.

The camera path window 43 also allows for editing the preset camera path information. Specifically, the camera path window 43 of this example allows for adjusting the depth of the arc (the diameter of the arc) of the movement trajectory of the viewpoint of an FV clip.

Such editing of the preset information as adjustment of the depth of the are is implemented by the above-described camera path editing processing unit 32c (see FIG. 5).

FIG. 22 illustrates an example of a GUI for adjusting the depth of the arc of a viewpoint movement trajectory.

The adjustment of the depth of the are of the viewpoint movement trajectory is performed by an operation of the viewpoint movement trajectory information 53, specifically, an operation such as a drag-and-drop operation to move the central portion of an are line corresponding to the viewpoint movement trajectory information 53, for example, as illustrated in the transition from A of FIG. 22 to B of FIG. 22. As illustrated in B of FIG. 22, when an operation is performed to move the central portion of the viewpoint movement trajectory information 53 in the convex direction of the arc, this becomes an instruction to increase the depth of the are (reduce the radius of curvature). Conversely, when an operation is performed to move the central portion of the viewpoint movement trajectory information 53 in the direction opposite to the convex direction of the arc, this becomes an instruction to reduce the depth of the are (increase the radius of curvature).

The GUI for adjusting the shape of the viewpoint movement trajectory is not limited to the above example. For example, for the depth of the arc by way of example, other operations can be employed such as an operation to move a slider arranged separately from the viewpoint movement trajectory information 53 to specify the depth of the are and an operation of an Up button or a Down button to specify the depth of the are (for example, the numerical value of the radius of curvature).

Figure 24:
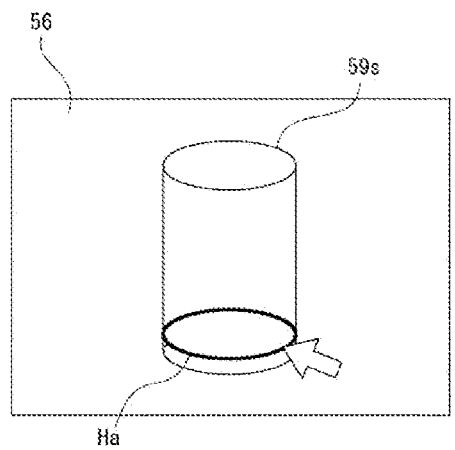
FIG. 24 includes again diagrams illustrating specification of the height position of the viewpoint rotation center.

FIGS. 23 to 25 are diagrams illustrating an operation to specify the viewpoint rotation center position in the target space image display section 45 and the GUI. Although operations on the start camera side will be described below as an example of operations and GUI, the same applies to operations and GUI on the end camera side, FIGS. 23 and 24 are diagrams illustrating specification of the height position of the viewpoint rotation center.

First, in this example, the rotation center position information 59 has a substantially cylindrical outer shape in appearance.

In this example, the rotation center position information 59 includes information indicating the height of the viewpoint rotation center. Specifically, as illustrated in A of FIG. 23, center height information Ha indicating the height position of the viewpoint rotation center is displayed as part of the rotation center position information 59. In this example, as the outer shape of the rotation center position information 59 is substantially cylindrical, the center height information Ha is substantially disk-shaped.

To specify the height position of the viewpoint rotation center, an operation is performed to select the center height information Ha in the rotation center position information 59, such as a click operation. Then, as illustrated in B of FIG. 23, the display mode of the center height information Ha changes, such as the display color of the center height information Ha changing. This allows the user to understand that the mode has been shifted to a mode of specifying the height position of the viewpoint rotation center.

This shift to the mode of specifying the height position allows the center height information Ha to be moved in the vertical direction as illustrated by way of example in FIG. 24, for example. Such an operation to move the center height information Ha makes it possible to specify the height position of the viewpoint rotation center (in other words, the elevation/depression angle of the free-viewpoint image).

FIG. 25 illustrates an operation example for specifying the position of the viewpoint rotation center (specifying the position in the horizontal direction). The operation to specify the horizontal position of the viewpoint rotation center is an operation such as a drag-and-drop operation to move the rotation center position information 59. When the horizontal position of the viewpoint rotation center is specified, an operation is performed to select the outer edge of the rotation center position information 59, such as a click operation (see A of FIG. 25). In response to this, as illustrated in B of FIG. 25, the display mode of the outer edge of the rotation center position information 59 changes, for example, the display color of the outer edge changes. This allows the user to understand that the mode has been shifted to a mode of specifying the horizontal position of the viewpoint rotation center.

This shift to the mode of specifying the horizontal position allows for moving the rotation center position information 59 in the horizontal direction to specify the horizontal position of the viewpoint rotation center.

FIGS. 26 and 27 illustrate an operation example of specifying an image frame for cropping.

Although an example of operations to specify an image frame and GUI on the start camera side will be described below as a representative example, the same applies to operations and GUI on the end camera side.

In this example, the image frame information 58 is information that indicates a rectangular line indicating the outer edge of the image frame, and the vertical center line and horizontal center line of the image frame.

In this example, immediately after the camera path is specified in the camera path list display section 44, the image frame information 58 is displayed as a frame having the same size as the original image size.

As illustrated in A of FIG. 26, to specify the size of the image frame, the outer edge of the image frame is selected by, for example, a click operation. In response to this, the display mode of the outer edge of the image frame changes, for example, the display color of the outer edge of the image frame changes. This allows the user to understand that the mode has been shifted to a mode of specifying the size of the image frame.

This shift to the mode of specifying the size allows for an operation such as a drag-and-drop operation to move the outer edge of the image frame information 58 in order to change the size of the outer edge of the image frame, that is, the size of the image frame, as illustrated in B of FIG. 26, resulting in the specification of the cropping size.

FIG. 27 illustrates an operation example of specifying the position of an image frame.

To specify the position of an image frame, as illustrated in A of FIG. 27, an operation is performed to select the intersection of the vertical center line and the horizontal center line of the image frame (that is, the center of the image frame), such as a click operation. In response to this, as illustrated in B of FIG. 27, the display mode of the vertical center line and horizontal center line of the image frame changes, for example, the display color of the vertical center line and horizontal center line changes (at this time, the display mode of the outer edge of the image frame returns to the original state), so that the user can understand that the mode has been shifted to the mode of specifying the position of the image frame.

This shift to the mode of specifying the position of the image frame allows for an operation such as a drag-and-drop operation to move the image frame information 58 in order to specify the position of the image frame. In other words, it is possible to specify a cropping position with respect to the image of the original size.

Figure 28:
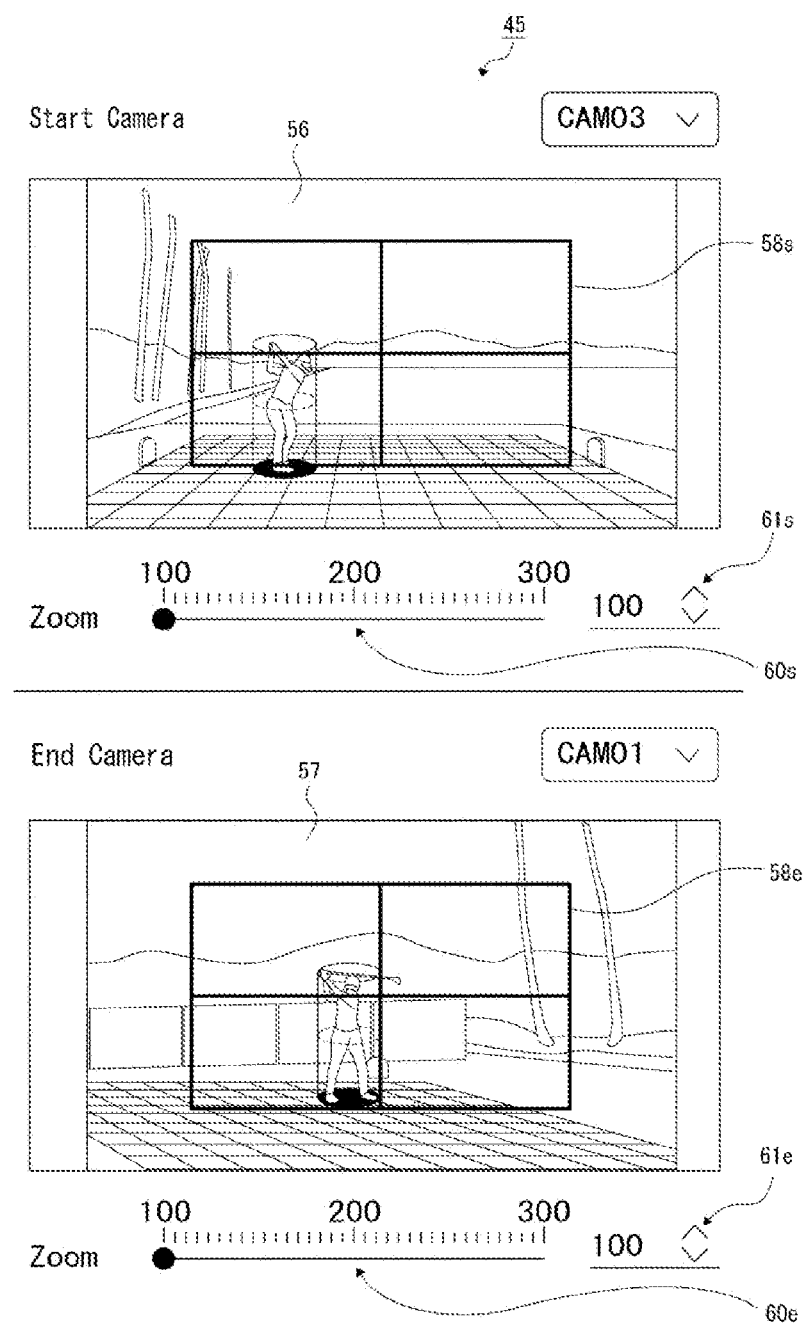
FIG. 28 includes diagrams illustrating a modification example of specifying the size of a cropping image frame.

For the specification of the size of a cropping image frame, it is also conceivable to provide slider operation sections 60*s* and 60*e* for size specification in the start camera image display area 56 and the end camera image display area 57, respectively, in the target space image display section 45, for example, as illustrated by way of example in FIG. 28. In this case, the size can be specified by performing an operation such as a drag-and-drop operation to move the slider. Alternatively, it is conceivable to provide an operation unit that enables size specification with an Up button and a Down button, such as size specification operation sections 61*s* and 61*e* byway of example in the figure. In this case, the size of the image frame is enlarged in response to an operation of the Up button, and the size of the image frame is reduced in response to an operation of the Down button.

In this example, for the start camera and the end camera, specifically, the rotation center position information 59*s* and the rotation center position information 59*e*, and the image frame information 58*s* and 58*e*, which are displayed, respectively, in the start camera image display area 56 and the end camera image display area 57, the position of the viewpoint rotation center (including the height position in this example) and the position and size of the cropping image frame can be set individually (that is, different positions and sizes can be set).

Figure 29:
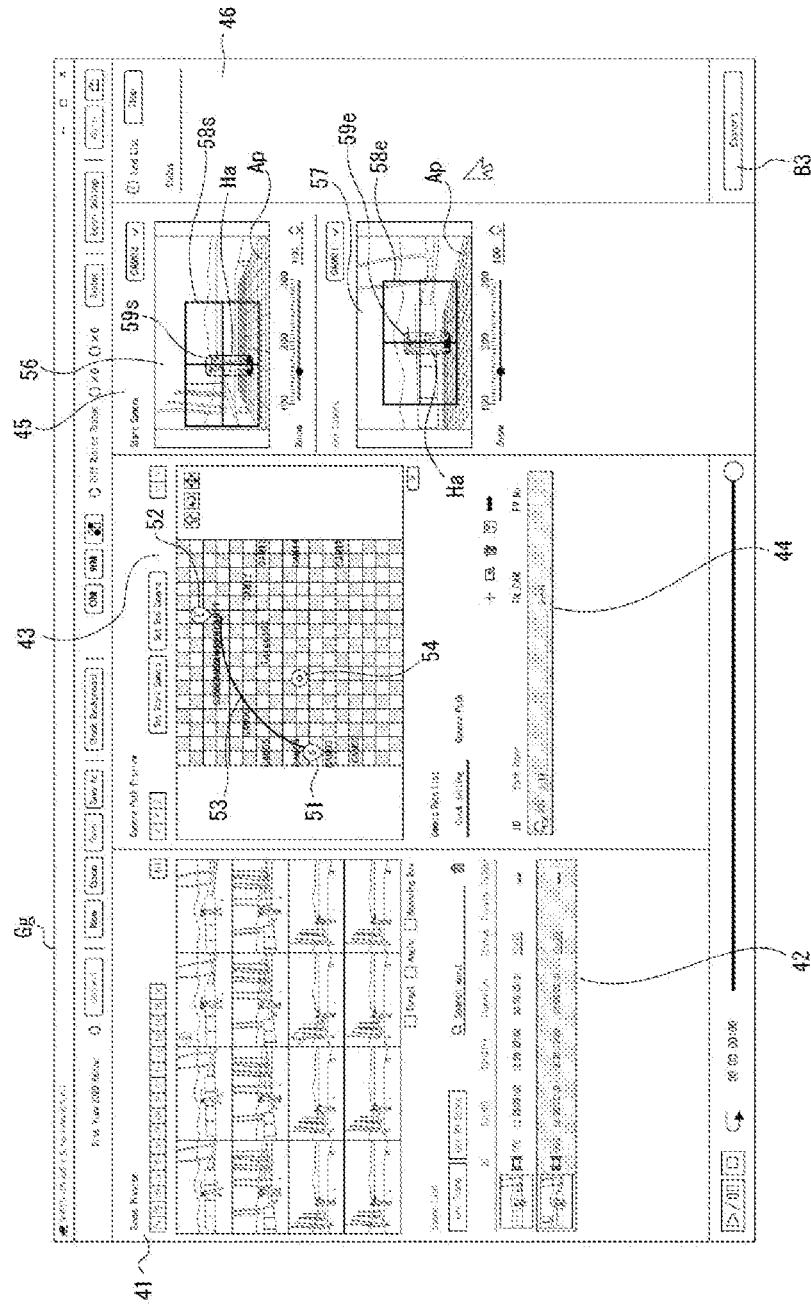
FIG. 29 illustrates an example of a state of the generation operation screen when the specification of the viewpoint rotation center and the image frame is completed.

FIG. 29 illustrates an example of a state of the generation operation screen Gg when the specification of the viewpoint rotation center position is completed with the rotation center position information 54 and the rotation center position information 59, and the specification of the position and size of the cropping image frame is completed with the image frame information 58. When the user has completed the specification of the viewpoint rotation center position and the position and size of the cropping image frame, the user can perform an operation on an export button B3 provided in the generation operation screen Gg to instruct the free-viewpoint image server 2 (the image generation processing unit 32) to generate an FV clip.

In response to the operation of the export button B3, the image generation processing unit 32 generates an FV clip based on the specified viewpoint rotation center position and information on the position and size of the cropping image frame.

As described above, the generated FV clip is transmitted to the image creation controller 1 via the NIAS 5 by the transmission control unit 33.

In the present embodiment, since the previous clip and the next clip are connected before and after the FV clip, respectively, the specification of the position and size of the image frame with the image frame information 58 in the target space image display section 45, that is, the specification of the cropping position and size results in the specification of the cropping position and size for the previous clip and the next clip.

In this example, the transmission control unit 33 performs a control to transmit information on the cropping position and size specified with the image frame information 58 to the image creation controller 1.

The image creation controller 1 performs cropping processing on each of the previous clip and the next clip according to the information on the cropping position and size thus transmitted.

In the above example, the viewpoint rotation center positions of the start camera and the end camera are allowed to be specified independently with the rotation center position information 59*s* and 59*e*. However, for the viewpoint rotation center positions of the start camera and the end camera, only a same position may be allowed to be specified.

In that case, the display processing unit 32*a* controls a display of the rotation center position information 59*s* and 59*e* so that one piece of the rotation center position information 59*s* and 59*e* is moved in conjunction with the movement of the other piece.

Although the generation operation screen Gg for 1 FV has been described above, the above-described GUI for specifying the camera path information, the viewpoint rotation center position, and the position and size of the cropping image frame may also be applied to 2 FV.

Figure 30:
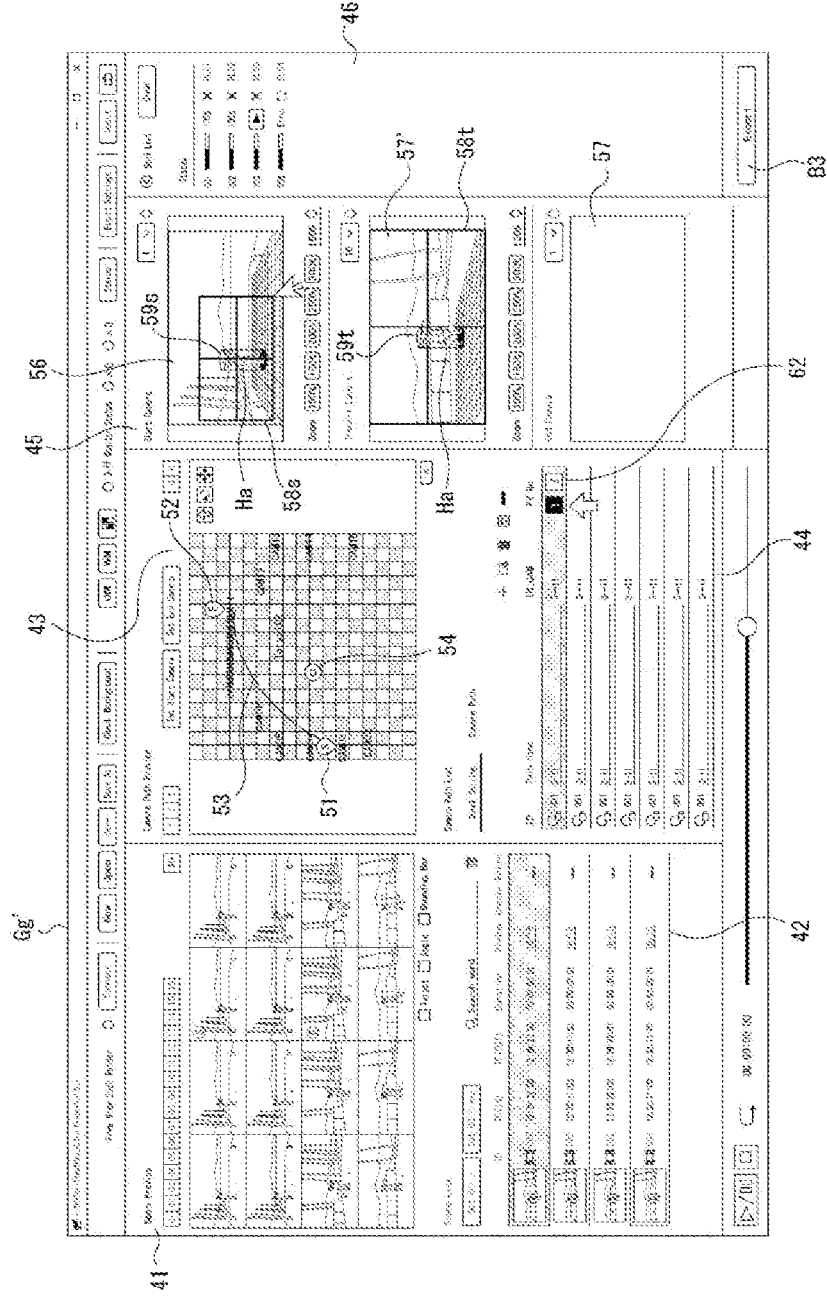
FIG. 30 illustrates an example of a generation operation screen for 2 FV.

FIG. 30 illustrates an example of a generation operation screen Gg' for 2 FV. For example, as illustrated in FIG. 30, for 2 FV, an FV specification operation section 62 for allowing the first FV clip and the second FV clip to be specified is provided in the camera path list display section 44. For 2 FV, in the camera path list display section 44, a list of camera path information generated for 2 FV on the preset screen Gs described above is displayed.

In the target space image display section 45 on the generation operation screen Gg', a transit camera image display area 57 for 2 FV is provided between the start camera image display area 56 and the end camera image display area 57.

FIG. 30 illustrates an example of a state of the generation operation screen Gg' when "1" representing the first FV clip is specified in the FV specification operation section 62. In this case, in the target space image display section 45, a captured image from the imaging device 10 serving as the start camera is displayed in the start camera image display area 56, and a captured image from the imaging device 10 serving as the transit camera is displayed in the transit camera image display area 57'. In the transit camera image display area 57, image frame information 58*t* and rotation center position information 59*t* are displayed as the image frame information 58 and the rotation center position information 59, respectively. With the image frame information 58*t* and the rotation center position information 59*t*, the position and size of the cropping image frame and the viewpoint rotation center position for the transit camera are allowed to be specified.

Figure 31:
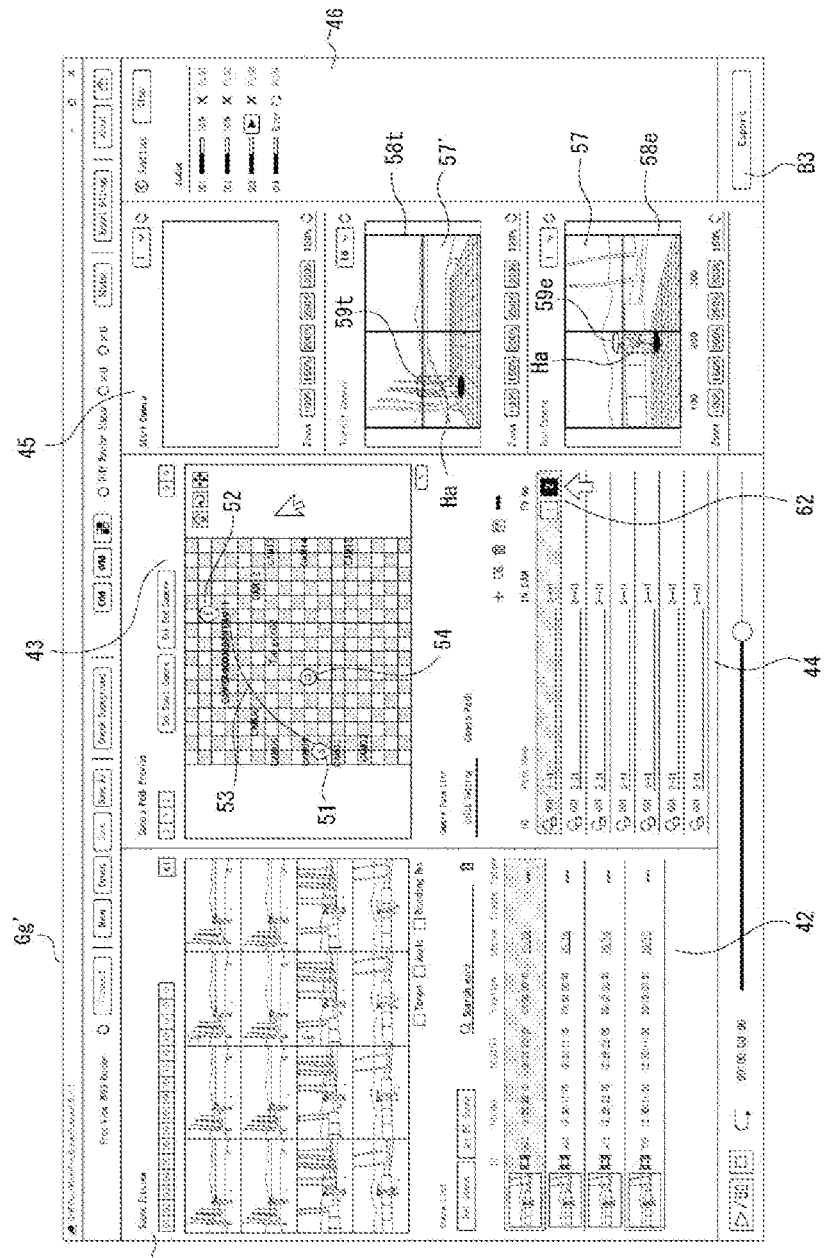
FIG. 31 illustrates a display example of the generation operation screen for 2 FV when a second FV clip is specified.

On the other hand, when "2" representing the second FV clip is specified in the FV specification operation section 62, in the target space image display section 45, a captured image from the imaging device 10 serving as the transit camera is displayed in the transit camera image display area 57, and a captured image from the imaging device 10 serving as the end camera is displayed in the end camera image display area 57, as illustrated by way of example in FIG. 31. Now for confirmation, for the second FV clip, a captured image from the transit camera in a scene (time) specified for the second FV clip is displayed in the transit camera image display area 57.

For example, the generation operation screen Gg' as described above allows the user to specify the viewpoint rotation center position and the position and size of the cropping image frame for each of the first and second FV clips for 2 FV.

It is not essential to provide the transit camera image display area 5T in the target space image display section 45 on the generation operation screen Gg' for 2 FV. At least two image display areas being provided allows for specifying the viewpoint rotation center position and the position and size of the cropping image frame of each of the first and second FV clips for each of the start camera and the end camera by display switching in the state where the first or second FV clip is specified.

8. Free-Viewpoint Image Generation of Embodiment

Next, free-viewpoint image generation in the embodiment will be described.

In the present embodiment, the previous clip and the next clip connected with the FV clip are images cropped from image data V according to the image frame information 58*s* and 58*e* described above.

Figure 32:
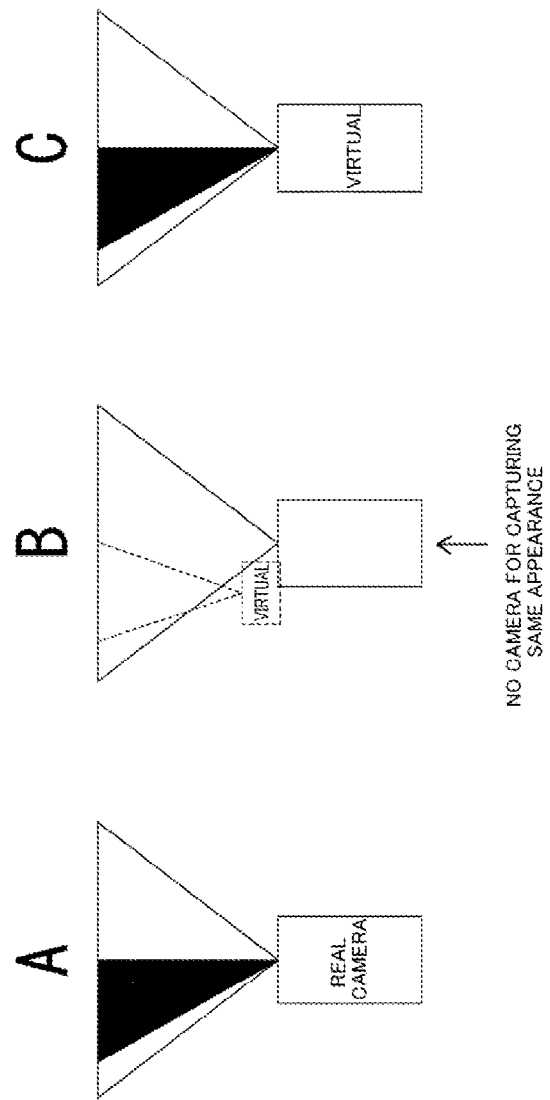
FIG. 32 includes diagrams illustrating the appearance of a subject in a cropped image.

FIG. 32 includes diagrams illustrating the appearance of a subject in a cropped image.

In FIG. 32, A schematically illustrates how a subject appears in an image cropped from a captured image from a real camera (imaging device 10) as a previous clip or a next clip.

The FV clip to be connected to the previous clip and the next clip, that is, an image from a virtual camera that captures a 3D model at a predetermined viewpoint, may be an image of the subject captured in front in the cropping range of the previous clip and the next clip, as illustrated by dashed lines in B of FIG. 32. However, as can be seen by comparison with A of FIG. 32, such a virtual camera being set makes the subject look different from the appearance of the subject in the previous clip and the next clip. In other words, even if a virtual camera whose angle of view is centered at the center of the cropping range in the previous clip and the next clip is set, the virtual camera cannot capture the image of the subject with the same appearance as the cropped image.

Therefore, in the present embodiment, each frame image forming the FV clip is also a cropped image. Thus, as an image from the virtual camera that captures the 3D model at the corresponding viewpoint, an image with the original size (4 k size in this example) is first generated in the same way as the previous clip and the next clip, and then a cropped image is generated (see C of FIG. 32).

Specifically, for example, an image of the FV clip at the start viewpoint, that is, an image from the start camera at the same viewpoint as the previous clip, is generated in a manner that an image is generated with the original size (4 k size in this example) and with the same angle of view and imaging direction as the imaging device 10 of the previous clip, and then an image with the image frame position and size specified with the image frame information 58*s* is cropped from the generated image. An image at the end viewpoint, that is, an image from the end camera at the same viewpoint as the next clip, is generated in a manner that an image is generated with the original size and with the same angle of view and imaging direction as the imaging device 10 of the next clip, and then an image with the image frame position and size specified with the image frame information 58*e* is cropped from the generated image.

Similarly, each frame image from the frame immediately after the start viewpoint to the frame immediately before the end viewpoint in the FV clip, is generated in a manner that an image is generated with the original size as an image from a virtual camera that captures the 3D model at the corresponding viewpoint, and then an image is cropped with the image frame of the corresponding position and size from the generated image.

As a result, in the case where an image to be connected to the FV clip is used as a cropped image, it is possible to alleviate the discomfort caused by the fact that the subject in the FV clip looks different from the image to be connected to the FV clip.

Note that in order to use each frame image in the FV clip as a cropped image as described above, it is desirable to perform cropping from the original size such that the center of the original size image matches the center of the cropping image frame as much as possible. Hereinafter, the cropping in which the center of the original size image matches the center of the cropping image frame will be simply referred to as "center cropping".

This center cropping makes it possible to reduce the processing load compared to cropping in which the center of the original size image does not match the center of the cropping image frame, and thus to reduce the processing load on cropping when the number of frames for the center cropping increases.

Therefore, in the present embodiment, during FV (that is, during movement of the viewpoint), the center of the cropping image frame is gradually transitioned from the position specified for the start camera so that a frame image is generated in the middle of FV by the center cropping.

Figure 33:
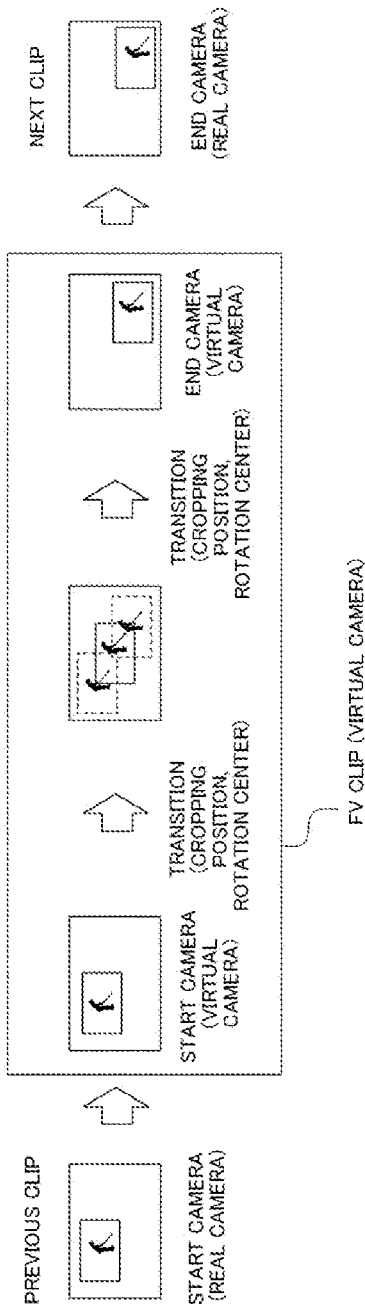
FIG. 33 illustrates an example of transition of cropping position in an FV clip.

FIG. 33 is a diagram illustrating the transition of the cropping position in an FV clip.

First, in this example, the start camera for the FV clip is at the same viewpoint as that of the imaging device 10 for the previous clip, and therefore the position of the cropping image frame is the position specified with the image frame information 58s.

In a predetermined number of frames after the frame immediately after the start viewpoint frame, the center position of the cropping image frame is gradually moved closer to the center position of the original size image from the position specified for the start camera (the upper left dashed line in the image frame in the figure). Then, in a predetermined number of frames in which the center position of the cropping image frame matches the center position of the original size image, the state where the center position of the cropping image frame matches the center position of the original size image is maintained, and after that, in a predetermined number of frames up to the frame immediately before the end viewpoint frame, the center position of the cropping image frame is gradually moved closer to the position of the cropping image frame specified for the end camera (the lower right dashed line in the image frame in the figure). As a result, frame images in the middle of FV can be generated by the center cropping, so that the processing load can be reduced.

Note that if the position of the cropping image frame is simply moved closer to the center position of the original size image as described above, there is a possibility that the subject of interest will be framed out of the cropping image frame in the middle of FV.

Therefore, in the present embodiment, when the position of the cropping image frame is transitioned, the position of the viewpoint rotation center is also gradually transitioned.

The viewpoint of each frame in the FV clip is determined as a predetermined viewpoint. Therefore, changing the position of the viewpoint rotation center makes it possible to change the line-of-sight direction from the viewpoint, thereby preventing the subject of interest from being framed out of the frame due to the transition of the position of the cropping image frame.

Accordingly, FIG. 33 illustrates an example in which when the position of the cropping image frame specified with the start camera is transitioned to the position of the cropping image frame specified with the end camera, the center cropping is naturally performed in the middle of FV.

Figure 34:
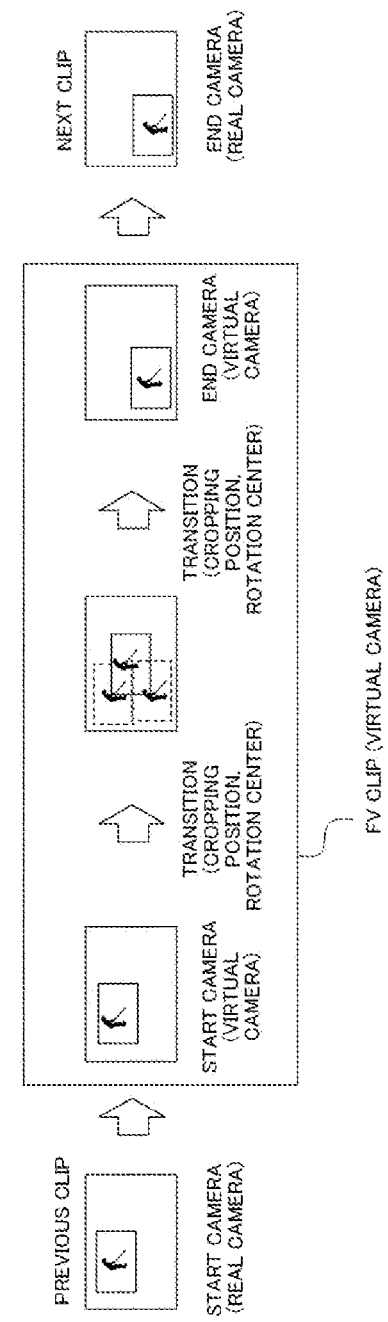
FIG. 34 illustrates another example of transition of cropping position in an FV clip.

However, as illustrated by way of example in FIG. 34, even if the position of the cropping image frame specified with the start camera is transitioned to the position of the cropping image frame specified with the end camera, the center cropping is not performed in the middle of FV in some cases. Specifically, in the example of FIG. 34, the position of the cropping image frame specified with the start camera is in an upper left portion within the image frame of the original size image, and the position of the cropping image frame specified with the end camera is in a lower left portion within the image frame of the original size image. Accordingly, even when the position of the cropping image frame is gradually transitioned from the position specified with the start camera to the position specified with the end camera during FV, there is no section where the center cropping is to be performed.

In the present embodiment, the position of the cropping image frame is transitioned so that there is a section where the center cropping is to be performed during FV even in the case where the center cropping is not performed even when the position of the cropping image frame is transitioned from the position specified with the start camera toward the position specified with the end camera.

The transition of the position of the cropping image frame has been described above as the transition of the cropping image frame during FV. However, the size of the cropping image frame may be transitioned. Specifically, when the size of the cropping image frame specified with the start camera is different from the size of the cropping image frame specified with the end camera, the size of the cropping image frame specified with the start camera is gradually transitioned to the size of the cropping image frame specified with the end camera.

The transition of the position of the cropping image frame during FV is not limited to passing through the position for the center cropping. For example, in the case of FIG. 34, the position of the cropping image frame with the start camera may be transitioned to the position of the cropping image frame specified with the end camera without passing through the position for the center cropping.

Also, the position of the cropping image frame specified with the start camera may match the position of the cropping image frame specified with the end camera. In that case, the transition of the position of the cropping image frame during FV may not be performed.

9. Processing Procedure

An example of a processing procedure for implementing a method of generating a free-viewpoint image included in the embodiment described above will be described with reference to the flowchart of FIG. 35. Specifically, it is an example of a processing procedure for implementing the functions of the image generation processing unit 32 including the display processing unit 32a, the operation reception unit 32b, and the camera path editing processing unit 33c, which are described above.

Figure 35:
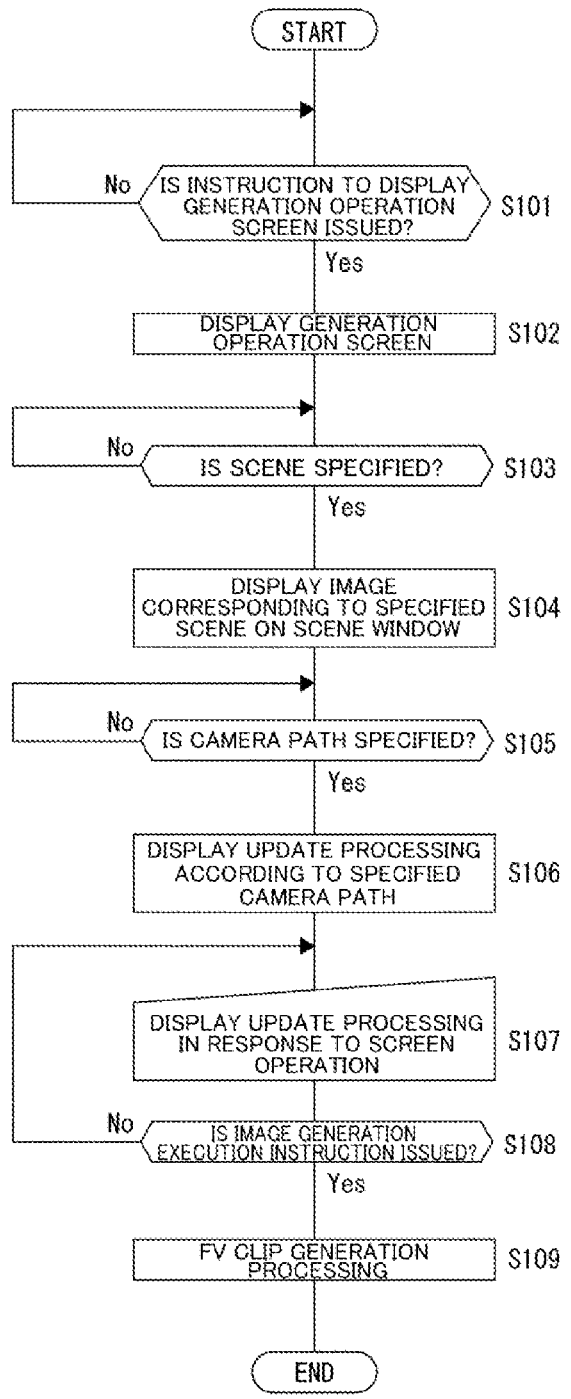
FIG. 35 is a flowchart illustrating a processing procedure example of implementing a method of generating a free-viewpoint image as an embodiment.

The processing illustrated in FIG. 35 is executed by the CPU 71 in the free-viewpoint image server 2 based on a program stored in the storage unit 79 or the like.

First, in step S101, the CPU 71 waits for an instruction to display the generation operation screen (g. For example, it waits for an instruction to launch a software program for generating an FV clip, installed in the free-viewpoint image server 2.

When receiving an instruction to display the generation operation screen Gg, the processing in the CPU 71 proceeds to step S102 to perform processing of displaying the generated operation screen Gg. Specifically, processing of displaying an initial screen (see FIG. 17) for the generated operation screen Gg on the screen of the display unit 77 is performed.

In step S103 following step S102, the CPU 71 waits for a scene being specified. Specifically, it waits for an operation to specify a scene in the scene list display section 42.

When a scene is specified, the processing in the CPU 71 proceeds to step S104 to perform processing of displaying an image corresponding to the specified scene on the scene window 41. Specifically, processing is performed that displays in the scene window 41 a captured image (image data V) from each imaging device 10 in the specified scene (see FIG. 18).

In step S105 following step S104, the CPU 71 waits for a camera path being specified. Specifically, it waits for an operation to specify camera path information in the camera path list display section 44.

When a camera path is specified, the CPU 71 performs display update processing according to the camera path specified in step S106. Specifically, as described above with reference to FIG. 19, processing of updating the display contents of the generation operation screen Gg is performed so as to display the start camera position information 51, the end camera position information 52, the viewpoint movement trajectory information 53, and the rotation center position information 54 in the camera path window 43, to display the "S" mark for the start camera and the "E" mark for the end camera in the scene window 41, and to display a captured image from the start camera, and a captured image from the end camera in the start camera image display area 56 and the end camera image display area 57 respectively as well as the image frame information 58s and 58e, the rotation center position information 59s and 59e, and the specifiable range information Ap in the target space image display section 45.

In step S108 following step S106, the CPU 71 executes display update processing in response to an operation on the screen. Specifically, performed are display update processing in response to an operation on the rotation center position information 54 in the camera path window 43, described with reference to FIGS. 20 and 21; display update processing in response to an operation on the viewpoint movement trajectory information 53, described with reference to FIG. 22; even display update processing in response to an operation on the image frame information 58s and 58e and the rotation center position information 59s and 59e (including the center height information Ha), described with reference to FIGS. 23 to 28; and the like.

As described above, for an operation to specify the position of the viewpoint rotation center on the rotation center position information 54 and the rotation center position information 59s and 59e, only a specification operations within the specifiable range indicated by the specifiable range information Ap is accepted as a valid specification operation.

In step S108 following step S107, the CPU 71 determines whether or not an image generation execution instruction has been issued. Specifically, it is processing of determining whether or not an FV clip generation execution instruction has been performed, and in this example, it is processing of determining whether or not an operation has been performed on the export button B3.

When no image generation execution instruction is issued, the processing in the CPU 71 returns to step S107 to perform display update processing in response to an operation on the screen.

On the other hand, when an image generation execution instruction is issued, the processing in the CPU 71 proceeds to step S109 to perform FV clip generation processing. Specifically, processing of generating an FV clip is executed based on the viewpoint rotation center position of each of the start camera and the end camera specified by the operation on the screen in step S107, the position and size of the cropping image frame, and the viewpoint movement trajectory information indicated by the specified camera path information. The specific method of generating an FV clip according to the present embodiment has already been described with reference to FIGS. 32 to 34, and therefore redundant description will be avoided.

In response to executing the processing of step S109, the CPU 71 ends the series of processes illustrated in FIG. 35.

10. Modification Example

The embodiment is not limited to the specific examples described above, and configurations as various modification examples can be adopted.

Figure 36:
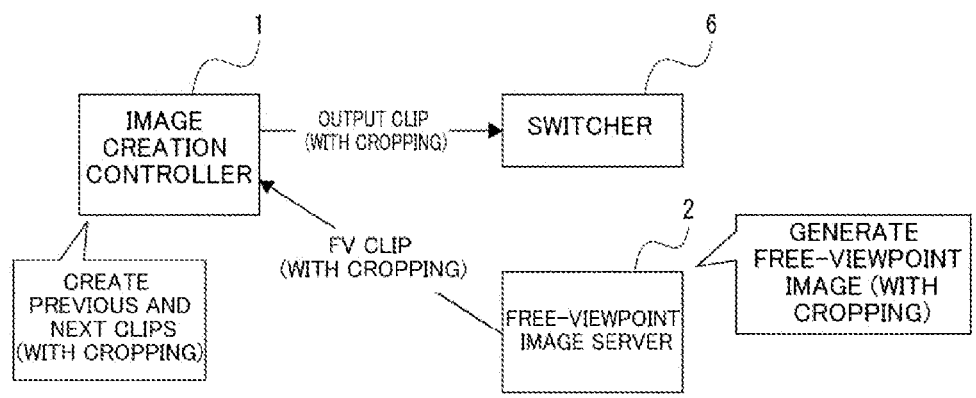
FIG. 36 is a diagram schematically illustrating processing sharing of the image generation exemplified in the embodiment.

For example, an example of processing sharing has been described in which the free-viewpoint image server 2 generates a free-viewpoint image as well as cropping, and the image creation controller 1 performs cropping in the previous clip and the next clip and outputs to the switcher 6 the previous clip and the next clip after cropping and the free-viewpoint image (with cropping) acquired from the free-viewpoint image server 2 as acquired clips, as illustrated in FIG. 36. This processing sharing makes it possible to reduce the amount of transfer data and the transfer time for the free-viewpoint image from the free-viewpoint image server 2 to the image creation controller 1.

Figure 37:
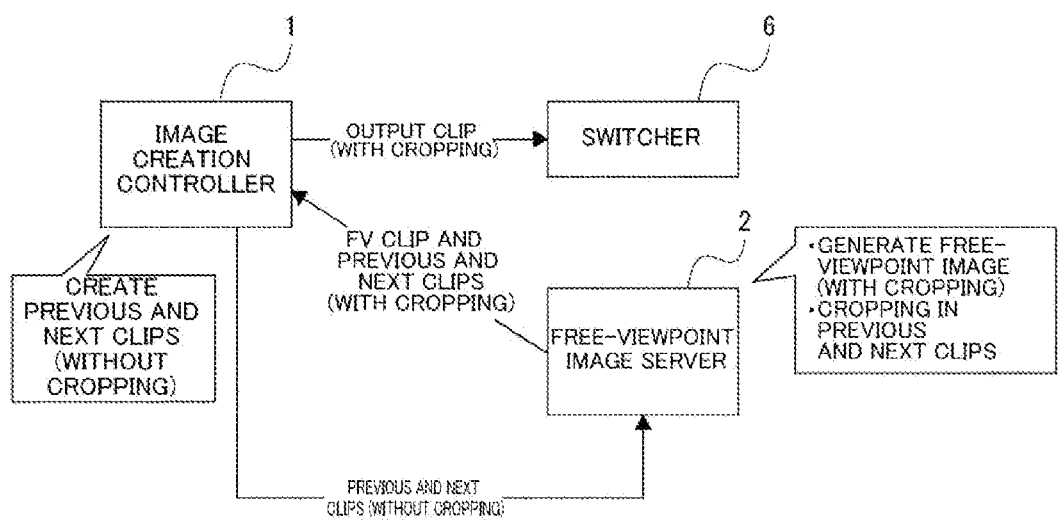
FIG. 37 is a diagram schematically illustrating another example of processing sharing of the image generation.

However, the method of processing sharing is not limited to such a method. For example, as illustrated in FIG. 37, a method can be performed in which the image creation controller 1 creates a previous clip and a next clip without cropping, and the free-viewpoint image server 2 creates a free-viewpoint image with cropping, and performs cropping on the previous clip and the next clip acquired from the image creation controller 1. In this case, the image creation controller 1 acquires from the free-viewpoint image server 2 the previous clip and the next clip after cropping and the free-viewpoint image and outputs them to the switcher 6 as output clips.

As illustrated in FIG. 37, the method in which the free-viewpoint image server 2 performs image cropping on all of the previous clip, the next clip, and the free-viewpoint image makes it possible to perform, with high accuracy, lens distortion correction on the previous clip and the next clip and lens distortion addition processing (processing of bringing the image from the virtual camera closer to the image from the real camera) on the free-viewpoint image.

Figure 38:
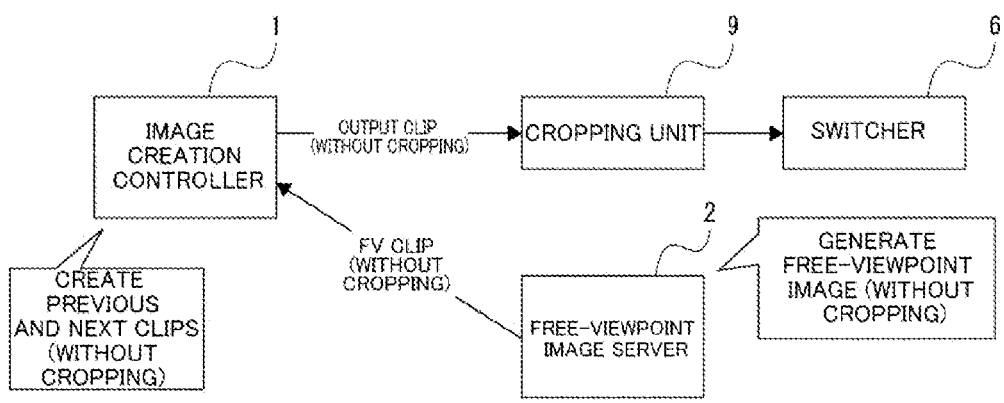
FIG. 38 is a diagram schematically illustrating still another example of processing sharing of the image generation.

Alternatively, as illustrated in FIG. 38, a method can be employed in which a cropping unit 9 is provided in the subsequent stage of the image creation controller 1, and this cropping unit 9 performs cropping on all of the previous clip, the next clip, and the free-viewpoint image. In this case, it goes without saying that the image creation controller 1 and the free-viewpoint image server 2 do not perform cropping on the previous clip, the next clip, and the free-viewpoint image.

In the case of the method of FIG. 38, the image creation controller 1 and the free-viewpoint image server 2 do not need cropping processing, so that there is an advantage that an existing FV creation system that does not perform cropping on the previous clip, the next clip, and the free viewpoint image can be used as they are.

There is also an advantage that an operator can finely adjust the cropping position while checking the content of the image in the subsequent stage of the image creation controller 1.

An example has been described above in which the position of the viewpoint rotation center is specified by a user's operation on the rotation center position information (54, 59). However, the position of the viewpoint rotation center may be determined based on a result of image recognition processing on a captured image of the target space.

For example, the image recognition processing in this case is performed by the image generation processing unit 32 (display processing unit 32*a*) as processing of recognizing a subject of interest (for example, a specific subject such as a specific player) from within the captured image of the target space.

For example, in the case where captured images from the start camera and the end camera are displayed as captured images of the target space so that the position of the viewpoint rotation center of each of the start camera and the end camera can be specified as in the above-described embodiment, it is conceivable to perform image recognition processing of recognizing a subject of interest on each of the captured image from the start camera and the captured image from the end camera, and determine the position where the subject of interest is located as the position of the viewpoint rotation center.

Here, the position of the viewpoint rotation center determined based on the result of the image recognition processing may be used as it is for generating a free-viewpoint image, or may be displayed as a candidate position of the viewpoint rotation center in each of the start camera image display area 56 and the end camera image display area 57.

Similarly, the position and size of the cropping image frame can also be determined based on a result of image recognition processing on the captured image of the target space.

For example, it is conceivable that the image generation processing unit 32 (display processing unit 32*a*) performs image recognition processing of recognizing the subject of interest on each of the captured image from the start camera and the captured image from the end camera, and determines a cropping image frame having a position and size within which the subject of interest is located.

Such information on the cropping image frame determined based on the result of the image recognition processing may also be used, for example, as it is for generating a free-viewpoint image, or may be displayed as a candidate of cropping image frame in each of the start camera image display area 56 and the end camera image display area 57.

A case has been described above in which a time-freeze free-viewpoint image is mainly generated as a free-viewpoint image. However, the method of specifying the position of a viewpoint rotation center and the method of specifying a cropping image frame, according to the embodiment described above can also be applied to a free-run free-viewpoint image. In that case, the target space captured image is a moving image, and therefore the GUI for specifying the viewpoint rotation center and the cropping image frame displays the rotation center position information and the image frame information on the moving image displayed as the target space captured image.

In the above description, it is assumed that the plurality of imaging devices 10 used to generate a free-viewpoint image are fixed cameras. However, some of the imaging devices 10 may be hand-held cameras.

In that case, it is conceivable to use the position information and orientation information of a hand-held camera to display the camera position on the generation operation screen Gg and update the camera position information used to generate an FV clip.

A case has been described above by way of example in which the shape of the rotation center position information 59 is substantially cylindrical. However, the shape of the rotation center position information 59 may be, for example, a quadrangular prism shape, a spherical shape, a rod shape, or the like, but is not limited to a specific shape.

The center height information Ha for specifying the height of the viewpoint rotation center is not limited to the examples of shape, and the height position may be specified by a slider or the like.

In the above description, the position of the viewpoint rotation center and the position of the cropping image frame can be adjusted individually. However, it is also conceivable to enter an operation mode that allows both the positions to be adjusted at the same time in response to a predetermined operation input such as double clicking or double tapping. For example, it is conceivable to provide a mode in which the centers of the rotation center position information 59 and the image frame information 58 are brought into the same position in response to double clicking, and in this state, the rotation center position information 59 and the image frame information 58 move in conjunction with each other in response to a movement instruction operation.

An example has been described above in which the free-viewpoint image server 2 is a common device that works as a device for receiving an operation input to perform processing of displaying the preset screen Gs or to generate a camera path and a device for receiving an operation input to perform processing of displaying the generation operation screen Gg or to generate a free-viewpoint image. However, it is also possible to adopt a form in which these devices are separate devices.

The target space captured image may be a captured image from a camera at the same viewpoint as an intermediate viewpoint during FV, instead of a captured image from the start camera or the end camera.

Alternatively, the target space captured image is not limited to a captured image from a camera at the same viewpoint as a viewpoint during FV, and may be an image obtained by capturing a real space for which a free-viewpoint image is to generated.

11. Summary of Embodiment

As described above, an information processing device (free-viewpoint image server 2) according to an embodiment includes a display control unit (display processing unit 32*a*) that controls a display of rotation center position information (59) on a target space captured image that is an image in which a real space for which a free-viewpoint image is to be generated is captured, the rotation center position information indicating a position of viewpoint rotation center of the free-viewpoint image.

With the above-described configuration, it is possible to visualize and display the position of viewpoint rotation center of the free-viewpoint image on the captured image in which the real space for which the free-viewpoint image is to be generated is captured.

Therefore, it becomes easier for the user to imagine what kind of image will be generated as a free-viewpoint image, and it is possible to provide quick creation of the free-viewpoint image.

Further, in the information processing device according to the embodiment, the rotation center position information includes information indicating a height of the viewpoint rotation center.

This makes it easier for the user to imagine the height position of the viewpoint rotation center of the free-viewpoint image, that is, the elevation/depression angle of the free-viewpoint image.

Therefore, it is possible to provide quick creation of the free-viewpoint image.

Further, in the information processing device according to the embodiment, the display control unit controls a display of information indicating a specifiable range of the viewpoint rotation center on the target space captured image (designable range information Ap).

This makes it easier for the user to imagine the specifiable range of the viewpoint rotation center with reference to the target space captured image.

Therefore, it is possible to provide quick creation of the free-viewpoint image.

Furthermore, the information processing device according to the embodiment also includes an operation reception unit (32*b*) that receives an operation on the rotation center position information displayed on a display unit (77). The operation reception unit receives only an operation to specify the position of the viewpoint rotation center within the specifiable range as a valid position specification operation.

This makes it possible to prevent the viewpoint rotation center from being set at a position that makes it impossible to generate a proper free-viewpoint image. Therefore, it is possible to provide a proper free-viewpoint image.

Further, in the information processing device according to the embodiment, the display control unit controls a display of information indicating an image frame of the free-viewpoint image on the target space captured image (image frame information 58).

This makes it easier for the user to imagine what kind of composition a free-viewpoint image will have with reference to the target space captured image when the free-viewpoint image is generated with an image frame size smaller than that of the target space captured image.

Therefore, it is possible to provide quick creation of the free-viewpoint image.

Furthermore, in the information processing device according to the embodiment, the target space captured image is a captured image from at least one of a start camera at a same viewpoint as a start viewpoint of the free-viewpoint image and an end camera at a same viewpoint as an end viewpoint of the free-viewpoint image among a plurality of cameras for obtaining captured images at a plurality of viewpoints used to generate the free-viewpoint image.

The composition of the free-viewpoint image at each of the start viewpoint and the end viewpoint is an important composition that influences the quality of the free-viewpoint image. For this reason, with the above-described configuration in which the target space captured image is a captured image from the start camera or the end camera and the rotation center position information is displayed on the target space captured image, it is easier for the user to imagine what kind of composition the free-viewpoint image will have.

Therefore, it is possible to provide quick creation of the free-viewpoint image.

Furthermore, in the information processing device according to the embodiment, the target space captured image is a captured image from the start camera and a captured image from the end camera.

The composition of the free-viewpoint image at each of the start viewpoint and the end viewpoint is an important composition that influences the quality of the free-viewpoint image, and with the above-described configuration in which the target space captured image is a captured image from each of the start camera and the end camera and the rotation center position information is displayed on the corresponding target space captured image, it is easier for the user to imagine what kind of composition the free-viewpoint image will have.

Therefore, it is possible to provide quick creation of the free-viewpoint image. The free-viewpoint image may be a free run image instead of a time freeze image. For a free run image, the position of the subject of interest may change during the movement of the viewpoint of the free-viewpoint image, and accordingly, there is a case where the user wants to shift the position of the viewpoint rotation center between the start time and the end time (for example, the user wants to shift the viewpoint rotation center, which corresponds to the position of the subject of interest at the start time, to the position of the subject of interest at the end time), and such a case is preferable.

Further, in the information processing device according to the embodiment, the start camera and the end camera are determined based on camera path information.

The camera path information can be created in advance as preset information. By determining the start camera and end camera according to the camera path information as the preset information, the camera path, an operation is not required to create a camera path on the spot when the viewpoint rotation center is specified.

Therefore, it is possible to provide quick creation of the free-viewpoint image.

Furthermore, in the information processing device according to the embodiment, the display control unit determines the rotation center position information based on a result of image recognition processing on the target space captured image. For example, when a free-viewpoint image focusing on a specific subject such as a specific player is generated, it is conceivable to recognize the specific subject by image recognition processing, and determine the rotation center position information at a position corresponding to the recognized subject.

Therefore, it is possible to reduce the operation burden on the user when determining the position of the viewpoint rotation center, and thus to provide quick creation of the free-viewpoint image.

Furthermore, in the information processing device according to the embodiment, the display control unit determines the image frame based on a result of image recognition processing on the target space captured image.

For example, when a free-viewpoint image focusing on a specific subject such as a specific player is generated, it is conceivable to recognize the specific subject by image recognition processing, and determine the image frame within which the recognized subject is located.

Therefore, it is possible to reduce the operation burden on the user when determining the image frame of the free-viewpoint image, and thus to provide quick creation of the free-viewpoint image.

Further, the information processing device according to the embodiment includes an operation reception unit (32*b*) that receives an operation on the rotation center position information displayed on a display unit, and an image generation unit (image generation processing unit 32) that generates a free-viewpoint image based on information on the viewpoint rotation center set based on the operation received by the operation reception unit.

This makes it possible to generate a free-viewpoint image whose composition changes according to the viewpoint rotation center set based on the operation.

Furthermore, in the information processing device according to the embodiment, the display control unit controls the display unit to display the information on the camera path indicated by the camera path information (see the camera path window 43).

As a result, the user is presented not only with the target space captured image and the rotation center position information, but also with the information on the camera path indicated by the camera path information (at least information indicating viewpoint movement trajectory).

Therefore, it becomes easier for the user to imagine what kind of composition the free-viewpoint image will have, and it is possible to provide quick creation of the free-viewpoint image.

Furthermore, in the information processing device according to the embodiment, the display control unit performs a control so that the rotation center position information is displayed in a display area for the information on the camera path. This makes it easier for the user to imagine the relationship between the viewpoint movement trajectory indicated by the camera path information and the position of the viewpoint rotation center. In addition, when an operation is performed on the rotation center position information on the target space captured image, it is possible to move the rotation center position information in a display area for the camera path in response to the operation.

Therefore, it becomes easier for the user to imagine what kind of composition the free-viewpoint image will have, and it is possible to provide quick creation of the free-viewpoint image.

Further, the information processing device according to the embodiment includes an operation reception unit (32*b*) that receives an operation on the information on the camera path as an operation to adjust a shape of a viewpoint movement trajectory indicated by the camera path information.

This makes it possible to easily edit an existing camera path through an operation on the camera path on the display screen.

Therefore, it is possible to provide quick creation of the free-viewpoint image.

Further, an information processing method according to an embodiment includes controlling, by an information processing device, a display of rotation center position information on a target space captured image that is an image in which a real space for which a free-viewpoint image is to be generated is captured, the rotation center position information indicating a position of viewpoint rotation center of the free-viewpoint image.

This information processing method can obtain the same operations and effects as the information processing device according to the above-described embodiment.

It is conceivable to provide as an embodiment a program to be executed by, for example, a CPU, a digital signal processor (DSP), or a device including such an element to perform the processing performed by the image generation processing unit 32 (for example, the display processing unit 32*a*, etc.) described with reference to FIG. 35 and others.

Specifically, a program according to an embodiment is a program that is readable by a computer device, and causes the computer device to implement a function of controlling a display of rotation center position information on a target space captured image that is an image in which a real space for which a free-viewpoint image is to be generated is captured, the rotation center position information indicating a position of viewpoint rotation center of the free-viewpoint image. This program can cause a device serving as the information processing device 70 to implement the function of the display processing unit 32*a* described above.

The above-described program can be recorded in advance in an HDD serving as a recording medium embedded in a device such as a computer device or a ROM or the like in a microcomputer that includes a CPU.

Alternatively, the program can be stored (recorded) temporarily or perpetually on a removable recording medium such as a flexible disc, a compact disc read-only memory (CD-ROM), a magneto optical (MO) disc, a digital versatile disc (DVD), a Blu-ray Disc (registered trademark), a magnetic disk, a semiconductor memory, or a memory card. The removable recording medium can be provided as so-called package software.

This program can be installed from the removable recording medium to a personal computer or the like and can also be downloaded from a download site via a network such as a local area network (LAN) or the Internet.

Further, this program is suitable for widely providing the display processing unit 32*a* according to the embodiment. For example, the program can be downloaded to a personal computer, a portable information processing device, a mobile phone, a game device, a video device, a personal digital assistant (PDA), or the like, making it possible for the personal computer or the like to function as a device that implements the processing of the display processing unit 32*a* according to the present disclosure.

Further, a display system as an embodiment includes: a display unit (the display unit 77 of the free-viewpoint image server 2) configured to display an image; and a display control unit (display processing unit 32*a*) that controls, in the display unit, a display of rotation center position information on a target space captured image that is an image in which a real space for which a free-viewpoint image is to be generated is captured, the rotation center position information indicating a position of viewpoint rotation center of the free-viewpoint image.

Even this display system can obtain the same operations and effects as the information processing device according to the above-described embodiment.

The advantageous effects described in the present specification are merely exemplary and are not limited, and other advantageous effects may be obtained.

12. Present Technology

The present technology can also adopt the following configurations.

(1)

An information processing device including a display control unit that controls a display of rotation center position information on a target space captured image that is an image in which a real space for which a free-viewpoint image is to be generated is captured, the rotation center position information indicating a position of viewpoint rotation center of the free-viewpoint image.

(2)

The information processing device according to (1), wherein the rotation center position information includes information indicating a height of the viewpoint rotation center.

(3)

The information processing device according to (1) or (2), wherein the display control unit controls a display of information indicating a specifiable range of the viewpoint rotation center on the target space captured image.

(4)

The information processing device according to (3), including an operation reception unit that receives an operation on the rotation center position information displayed on a display unit, wherein the operation reception unit receives only an operation to specify the position of the viewpoint rotation center within the specifiable range as a valid position specification operation.

(5)

The information processing device according to any one of (1) to (4), wherein the display control unit controls a display of information indicating an image frame of the free-viewpoint image on the target space captured image.

(6)

The information processing device according to any one of (1) to (5), wherein the target space captured image is a captured image from at least one of a start camera at a same viewpoint as a start viewpoint of the free-viewpoint image and an end camera at a same viewpoint as an end viewpoint of the free-viewpoint image among a plurality of cameras for obtaining captured images at a plurality of viewpoints used to generate the free-viewpoint image.

(7)

The information processing device according to (6), wherein the target space captured image is a captured image from the start camera and a captured image from the end camera.

(8)

The information processing device according to (6) or (7), wherein the start camera and the end camera are determined based on camera path information.

(9)

The information processing device according to any one of (1) to (8), wherein the display control unit determines the rotation center position information based on a result of image recognition processing on the target space captured image.

(10)

The information processing device according to (5), wherein the display control unit determines the image frame based on a result of image recognition processing on the target space captured image.

(11)

The information processing device according to any one of (1) to (10), including: an operation reception unit that receives an operation on the rotation center position information displayed on a display unit; and an image generation unit that generates a free-viewpoint image based on information on the viewpoint rotation center set based on the operation received by the operation reception unit.

(12)

The information processing device according to any one of (1) to (11), wherein the display control unit controls a display unit to display information on a camera path indicated by camera path information.

(13)

The information processing device according to (12), wherein the display control unit performs a control so that the rotation center position information is displayed in a display area for the information on the camera path.

(14)

The information processing device according to (12) or (13), including an operation reception unit that receives an operation on the information on the camera path as an operation to adjust a shape of a viewpoint movement trajectory indicated by the camera path information.

(15)

An information processing method including controlling, by an information processing device, a display of rotation center position information on a target space captured image that is an image in which a real space for which a free-viewpoint image is to be generated is captured, the rotation center position information indicating a position of viewpoint rotation center of the free-viewpoint image.

(16)

A program that is readable by a computer device, the program causing the computer device to implement a function of controlling a display of rotation center position information on a target space captured image that is an image in which a real space for which a free-viewpoint image is to be generated is captured, the rotation center position information indicating a position of viewpoint rotation center of the free-viewpoint image.

(17)

A display system including:

a display unit configured to display an image; and a display control unit that controls, in the display unit, a display of rotation center position information on a target space captured image that is an image in which a real space for which a free-viewpoint image is to be generated is captured, the rotation center position information indicating a position of viewpoint rotation center of the free-viewpoint image.

REFERENCE SIGNS LIST

2 Free viewpoint image server
10 Imaging device
31 Target image acquisition unit
32 Image generation processing unit
32$a$ Display processing unit
32$b$ Operation reception unit
32$c$ Camera path editing processing unit
33 Transmission control unit
34 Camera path generation processing unit
34$a$ Display processing unit
Gg Generation operation screen
Gs Preset screen
41 Scene window
42 Scene list display section
43 Camera path window
44 Camera path list display section
45 Target space image display section
46 Transmission window
51 Start camera position information
52 End camera position information
53 Viewpoint movement trajectory information
54 Rotation center position information
56 Start camera image display area
57 End camera image display area
58$s$, 58$e$ Image frame information
59$s$, 59$e$ Rotation center position information
Ap Specifiable range information
Ha Center height information
60$s$, 60$e$ Slider operation section
61$s$, 61$e$ Size specification operation section
62 FV specification operation section 65 Path name input section
66 FV number selection section
67 Camera selection section
68 Rotating direction selection section
B1 OK button
B2 Cancel button
B3 Export button
70 Information processing device
71 CPU
72 ROM
73 RAM
74 Bus
75 Input/output interface
76 Input unit
77 Display unit
78 Sound output unit
79 Storage unit
80 Communication unit
81 Removable recording medium
82 Drive

The invention claimed is:

1. An information processing device comprising:
   circuitry configured to
      determine rotation center position information with respect to a plurality of images captured by a plurality of imaging devices, and
      control display of the determined rotation center position information on a target space captured image captured by one of the plurality of imaging devices,
   wherein the target space captured image is an image capturing a real space for which a free-viewpoint image is generated using the plurality of images,
   wherein the rotation center position information indicates a position of viewpoint rotation center of the free-viewpoint image generated from a start imaging device at a start viewpoint of the free-viewpoint image to an end imaging device at an end viewpoint of the free-viewpoint image, and
   wherein the circuitry is further configured to control display of an imaging device path indicated by imaging device path information from the start viewpoint to the end viewpoint, the imaging device path determining the rotation center position information.

2. The information processing device according to claim 1,
   wherein the rotation center position information includes information indicating a height of the viewpoint rotation center.

3. The information processing device according to claim 1,
   wherein the circuitry controls the display of the determined rotation center position information by displaying information indicating a specifiable range of the viewpoint rotation center on the target space captured image.

4. The information processing device according to claim 3,
   wherein the circuitry is further configured to receive an operation on the displayed rotation center position information, and
   wherein the circuitry receives only an operation to specify the position of the viewpoint rotation center within the specifiable range as a valid position specification operation.

5. The information processing device according to claim 1,
   wherein the circuitry controls a display of information indicating an image frame of the free-viewpoint image on the target space captured image.

6. The information processing device according to claim 1,
   wherein the target space captured image is a captured image from at least one of the start imaging device at the start viewpoint of the free-viewpoint image and the end imaging device at the end viewpoint of the free-viewpoint image.

7. The information processing device according to claim 6,
   wherein the start imaging device and the end imaging device are determined based on the imaging device path information.

8. The information processing device according to claim 1,
   wherein the circuitry determines the rotation center position information based on a result of image recognition processing on the target space captured image.

9. The information processing device according to claim 5,
   wherein the circuitry determines the image frame based on a result of image recognition processing on the target space captured image.

10. The information processing device according to claim 6,
    wherein the target space captured image includes the captured image from the start imaging device and the captured image from the end imaging device.

11. The information processing device according to claim 1,
    wherein the circuitry is further configured to
       receive an operation on the displayed rotation center position information, and
       generate the free-viewpoint image based on information on the viewpoint rotation center set based on the received operation.

12. The information processing device according to claim 1,
    wherein the circuitry controls the display of the determined rotation so that the rotation center position information is displayed in a display area for the information on the camera path.

13. The information processing device according to claim 1,
    wherein the circuitry is further configured to receive an operation on the information on imaging device path as an operation to adjust a shape of a viewpoint movement trajectory indicated by imaging device path information.

14. The information processing device according to claim 1,
    wherein the circuitry controls the determined rotation center position to be displayed immediately after the imaging device path information is specified.

15. An information processing method comprising:
    determining, by an information processing device, rotation center position information with respect to a plurality of images captured by a plurality of imaging devices; and
    controlling, by the information processing device, display of the determined rotation center position information on a target space captured image captured by one of the plurality of imaging devices, wherein the target space captured image is an image capturing a real space for which a free-viewpoint image is generated using the plurality of images, wherein the rotation center position information indicates a position of viewpoint rotation center of the free-viewpoint image generated from a start imaging device at a start viewpoint of the free-viewpoint image to an end imaging device at an end viewpoint of the free-viewpoint image, and wherein the method further comprises controlling display of an imaging device path indicated by imaging device path information from the start viewpoint to the end viewpoint, the imaging device path determining the rotation center position information.

16. A non-transitory computer-readable storage medium having embodied thereon a program, which when executed by a computer device causes the computer device to implement a function of execute a method, the method comprising:

determining rotation center position information with respect to a plurality of images captured by a plurality of imaging devices; and controlling display of the determined rotation center position information on a target space captured image captured by one of the plurality of imaging devices, wherein the target space captured image is an image capturing a real space for which a free-viewpoint image is generated using the plurality of images, wherein the rotation center position information indicates a position of viewpoint rotation center of the free-viewpoint image generated from a start imaging device at a start viewpoint of the free-viewpoint image to an end imaging device at an end viewpoint of the free-viewpoint image, and wherein the method further comprises controlling display of an imaging device path indicated by imaging device path information from the start viewpoint to the end viewpoint, the imaging device path determining the rotation center position information.

17. A display system comprising:

a display device configured to display an image; and circuitry configured to
  determine rotation center position information with respect to a plurality of images captured by a plurality of imaging devices, and
  control, in the display device, display of the determined rotation center position information on a target space captured image captured by one of the plurality of imaging devices, wherein the target space captured image is an image capturing a real space for which a free-viewpoint image is generated using the plurality of images, wherein the rotation center position information indicates a position of viewpoint rotation center of the free-viewpoint image generated from a start imaging device at a start viewpoint of the free-viewpoint image to an end imaging device at an end viewpoint of the free-viewpoint image, and wherein the circuitry is further configured to control, in the display device, display of an imaging device path indicated by imaging device path information from the start viewpoint to the end viewpoint, the imaging device path determining the rotation center position information.

* * * * *